(12) United States Patent
Ding et al.

(10) Patent No.: US 11,025,393 B2
(45) Date of Patent: Jun. 1, 2021

(54) WIRELESS COMMUNICATION METHOD, WIRELESS COMMUNICATIONS APPARATUS, AND WIRELESS COMMUNICATIONS SYSTEM

(71) Applicant: HUAWEI TECHNOLOGIES CO., LTD., Guangdong (CN)

(72) Inventors: Mengying Ding, Shanghai (CN); Yuanzhou Hu, Shanghai (CN); Pengpeng Dong, Shanghai (CN); Zongjie Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 55 days.

(21) Appl. No.: 16/579,637

(22) Filed: Sep. 23, 2019

(65) Prior Publication Data
US 2020/0021414 A1    Jan. 16, 2020

Related U.S. Application Data

(63) Continuation of application No. PCT/CN2018/093475, filed on Jun. 28, 2018.

(30) Foreign Application Priority Data

Jun. 30, 2017 (CN) .......................... 201710527155.4

(51) Int. Cl.
*H04L 5/00* (2006.01)
*H04L 27/00* (2006.01)
*H04L 27/233* (2006.01)

(52) U.S. Cl.
CPC ........ *H04L 5/0051* (2013.01); *H04L 27/0008* (2013.01); *H04L 27/233* (2013.01)

(58) Field of Classification Search
CPC .. H04L 5/0051; H04L 27/0008; H04L 27/233
See application file for complete search history.

(56) References Cited

U.S. PATENT DOCUMENTS

2014/0140301 A1    5/2014    Hao et al.
2014/0293881 A1    10/2014   Khoshnevis et al.
(Continued)

FOREIGN PATENT DOCUMENTS

CN    101179860 A    5/2008
CN    101227734 A    7/2008
(Continued)

OTHER PUBLICATIONS

Extended European Search Report issued in European Application No. 18824197.0 dated Mar. 12, 2020, 8 pages.
(Continued)

*Primary Examiner* — Ronald B Abelson
(74) *Attorney, Agent, or Firm* — Fish & Richardson P.C.

(57) ABSTRACT

This application discloses a wireless communication method, a wireless communications apparatus, and a wireless communications system. An example wireless communication method includes: receiving, by a terminal, indication information of uplink data transmission from a base station; determining, by the terminal, a base sequence configuration of a reference signal sequence corresponding to the modulation scheme of the uplink data transmission, and generating a dedicated demodulation reference signal based on the determined base sequence configuration of the reference signal sequence, where the modulation scheme of the uplink data transmission is one of a plurality of modulation schemes supported by the terminal, the plurality of modulation schemes include at least π/2 binary phase shift keying (BPSK), and a base sequence configuration of a reference signal sequence corresponding to the π/2 BPSK is different from a base sequence configuration of a reference signal
(Continued)

sequence corresponding to another modulation scheme in the plurality of modulation schemes.

20 Claims, 6 Drawing Sheets

(56) References Cited

U.S. PATENT DOCUMENTS

| | | |
|---|---|---|
| 2015/0010105 A1 | 1/2015 | Kim et al. |
| 2015/0288483 A1 | 10/2015 | Sun et al. |
| 2018/0041957 A1* | 2/2018 | Xiong ............... H04W 52/0216 |
| 2019/0342052 A1 | 11/2019 | Hu et al. |
| 2020/0029325 A1 | 1/2020 | Hwang et al. |

FOREIGN PATENT DOCUMENTS

| | | |
|---|---|---|
| CN | 101917356 A | 12/2010 |
| CN | 102404854 A | 4/2012 |
| CN | 103379511 A | 10/2013 |
| CN | 103415067 A | 11/2013 |
| CN | 103999421 A | 8/2014 |
| CN | 104980247 A | 10/2015 |
| CN | 105144817 A | 12/2015 |
| CN | 108289021 A | 7/2018 |
| EP | 3107237 A1 | 12/2016 |
| WO | 2009031816 A1 | 3/2009 |
| WO | 2012071721 A1 | 6/2012 |
| WO | 2017026814 A1 | 2/2017 |

OTHER PUBLICATIONS

Huawei et al., "Further consideration on pi/2 BPSK with FDSS," 3GPP TSG RAN WG1 NR Ad Hoc Meeting, R1-1710474; Qingdao, China, XP051299685, Jun. 27-30, 2017, 10 pages.

Huawei et al., "UL SRS design for CSI acquisition and beam management," 3GPP TSG RAN WG1 Meeting #88bis, R1-1704241; Spokane, USA, Apr. 3-7, 2017, 16 pages.

Nokia et al., "On PAPR/CM reduction techniques over QPSK/DFT-S-OFDM uplink," 3GPP TSG-RAN WG1 #87, R1-1612270; Reno, USA, Nov. 14-18, 2016, 6 pages.

Nokia Networks et al., "On UL DMRS design for NB-IoT," 3GPP TSG RAN WG1 Meeting #84bis, R1-163419; Busan, Korea, XP051097168, Apr. 11-15, 2016, 6 pages.

Office Action issued in Chinese Application No. 201710527155.4 dated May 21, 2019, 9 pages.

Office Action issued in Chinese Application No. 201710527155.4 dated Mar. 20, 2020, 5 pages.

PCT International Search Report and Written Opinion issued in International Application No. PCT/CN2018/093475 dated Sep. 25, 2018, 17 pages (with English translation).

* cited by examiner

WIRELESS COMMUNICATION METHOD, WIRELESS COMMUNICATIONS APPARATUS, AND WIRELESS COMMUNICATIONS SYSTEM

CROSS-REFERENCE TO RELATED APPLICATIONS

This application is a continuation of International Application No. PCT/CN2018/093475, filed on Jun. 28, 2018, which claims priority to Chinese Patent Application No. 201710527155.4, filed on Jun. 30, 2017. The disclosures of the aforementioned applications are hereby incorporated by reference in their entireties.

TECHNICAL FIELD

This application relates to the field of communications technologies, and specifically, to a wireless communication method, a wireless communications apparatus, and a wireless communications system.

BACKGROUND

A communications system may be divided into three parts: a sending device, a channel, and a receiving device. The channel is a transmission channel of a signal, and may be understood as a transmission medium of the signal. Based on different transmission media, communications systems may be classified into a wired communications system and a wireless communications system. Especially, in the wireless communications system, a signal is usually distorted during transmission because of a non-ideal characteristic of the transmission medium. In other words, a signal received by a receiving device is not completely the same as a signal initially sent by a sending device. A difference between the two signals is signal distortion, and the signal distortion depends on a channel characteristic. Therefore, estimating the channel characteristic helps cancel the signal distortion, and improve performance of the communications system.

A reference signal (reference signal, RS) is a signal whose content is known, and is sometimes also referred to as a pilot signal (pilot signal). The content of the reference signal, namely, a reference signal sequence carried in the reference signal, is usually pre-appointed in the communications system. Therefore, before receiving the reference signal, the receiving device may know the content of the reference signal based on a configuration of the system. Then the receiving device obtains the reference signal sequence from the received reference signal, and compares the reference signal sequence with an expected reference signal sequence, to estimate the channel characteristic. The channel characteristic estimated by the receiving device may be used to demodulate a data signal, and the data signal is a signal that carries data information. Different from that of the reference signal, content of the data signal, namely, data information, is unknown to the receiving device. However, the receiving device may still correctly demodulate, by virtue of the estimated channel characteristic, the data information from the data signal transmitted on the channel, thereby accomplishing a communication target.

In a long term evolution (long term evolution, LTE) system for 4th generation (the 4th generation, 4G) mobile communication, an uplink reference signal includes a dedicated demodulation reference signal (demodulation reference signal, DMRS or DM-RS) and a sounding reference signal (sounding reference signal, SRS), "uplink" refers to a transmission direction from a terminal to a base station, and correspondingly, "downlink" refers to a transmission direction from the base station to the terminal. The DMRS is mainly used to demodulate a physical uplink channel. In this way, the base station can correctly demodulate data information on the physical uplink channel. The physical uplink channel herein includes a physical uplink shared channel (physical uplink shared channel, PUSCH) or a physical uplink control channel (physical uplink control channel, PUCCH). The SRS is mainly used to estimate quality of an uplink channel on different frequency bands. In this way, the base station can effectively allocate an appropriate resource and transmission parameter for uplink transmission. The DMRS is located on a frequency band on the PUSCH or the PUCCH, and is transmitted with the PUSCH or the PUCCH, to demodulate a PUSCH or a PUCCH associated with the DMRS. Different from the DMRS, the SRS is not necessarily transmitted with any physical uplink channel. In addition, if the SRS is transmitted with the physical uplink channel (for example, the PUSCH), the SRS may usually occupy a different and higher frequency band.

With evolution of technologies, a technical specification (technical specification, TS) of a new mobile communications system is also being continuously studied and formulated. For example, in a 5th generation (the 5th generation, 5G) mobile communications system, a wireless transmission technology used between the terminal and the base station may be redesigned. Therefore, this part of the technical specification is referred to as 5G new radio (new radio, NR) or a 5G new air interface (air interface). Compared with those of 4G LTE, new technical solutions are introduced in each aspect of the 5G NR, for example, a spectrum, coding, modulation, and waveform. Therefore, new technical solutions need to be continuously provided to adapt to evolution of the wireless transmission technology and improve wireless communication performance.

SUMMARY

With reference to a plurality of implementations, this application provides a wireless communication method, a wireless communications apparatus, and a wireless communications system, to improve wireless communication performance.

It should be understood that the term "and/or" in this application describes an association relationship between associated objects and indicates that three relationships may exist. For example, "A and/or B" may indicate that the following three cases: only A exists, both A and B exist, and only B exists. The character "/" generally indicates an "or" relationship between the associated objects.

According to a first aspect, a wireless communication method is provided, the wireless communication method may be performed by a terminal, and the wireless communication method includes:

receiving indication information of uplink data transmission, where the indication information is used to indicate a modulation scheme of the uplink data transmission; and determining a base sequence configuration of a reference signal sequence corresponding to the modulation scheme of the uplink data transmission, and generating a dedicated demodulation reference signal based on the determined base sequence configuration of the reference signal sequence, where the modulation scheme of the uplink data transmission is one of a plurality of modulation schemes supported by the terminal, the plurality of modulation schemes include at least π/2 binary phase shift keying (BPSK), and a base sequence configuration of a reference signal sequence corresponding to the π/2 BPSK is different from a base sequence configuration of a reference signal sequence corresponding to another modulation scheme in the plurality of modulation schemes.

According to a second aspect, a wireless communication method is provided, the wireless communication method may be performed by a base station, and the wireless communication method includes:

sending indication information of uplink data transmission, where the indication information is used to indicate a modulation scheme of the uplink data transmission;

receiving a dedicated demodulation reference signal associated with the uplink data transmission; and determining a base sequence configuration of a reference signal sequence corresponding to the modulation scheme of the uplink data transmission, to estimate a channel characteristic for the uplink data transmission, where the modulation scheme of the uplink data transmission is one of a plurality of modulation schemes supported by the terminal, the plurality of modulation schemes include at least π/2 BPSK, and a base sequence configuration of a reference signal sequence corresponding to the π/2 BPSK is different from a base sequence configuration of a reference signal sequence corresponding to another modulation scheme in the plurality of modulation schemes.

According to a third aspect, a wireless communications apparatus is provided, the wireless communications apparatus may be a terminal, and the wireless communications apparatus includes:

a receiver, configured to receive indication information of uplink data transmission, where the indication information is used to indicate a modulation scheme of the uplink data transmission; and a processor, configured to determine a base sequence configuration of a reference signal sequence corresponding to the modulation scheme of the uplink data transmission, and generate a dedicated demodulation reference signal based on the determined base sequence configuration of the reference signal sequence, where the modulation scheme of the uplink data transmission is one of a plurality of modulation schemes supported by the terminal, the plurality of modulation schemes include at least π/2 BPSK, and a base sequence configuration of a reference signal sequence corresponding to the π/2 BPSK is different from a base sequence configuration of a reference signal sequence corresponding to another modulation scheme in the plurality of modulation schemes.

According to a fourth aspect, a wireless communications apparatus is provided, the wireless communications apparatus may be a base station, and the wireless communications apparatus includes:

a transmitter, configured to send indication information of uplink data transmission, where the indication information is used to indicate a modulation scheme of the uplink data transmission;

a receiver, configured to receive a dedicated demodulation reference signal associated with the uplink data transmission; and a processor, configured to determine a base sequence configuration of a reference signal sequence corresponding to the modulation scheme of the uplink data transmission, to estimate a channel characteristic for the uplink data transmission, where the modulation scheme of the uplink data transmission is one of a plurality of modulation schemes supported by the terminal, the plurality of modulation schemes include at least π/2 BPSK, and a base sequence configuration of a reference signal sequence corresponding to the π/2 BPSK is different from a base sequence configuration of a reference signal sequence corresponding to another modulation scheme in the plurality of modulation schemes.

According to a fifth aspect, a wireless communications apparatus is provided, the wireless communications apparatus may be a terminal (or a chip or a system on chip that is disposed in the terminal), and the wireless communications apparatus includes:

a processor, and a memory connected to the processor, where the memory stores program code, and the program code is executed by the processor, so that the wireless communications apparatus (or the terminal) performs the method according to the first aspect.

According to a sixth aspect, a wireless communications apparatus is provided, the wireless communications apparatus may be a base station (or a chip or a system on chip that is disposed in the base station), and the wireless communications apparatus includes:

a processor, and a memory connected to the processor, where the memory stores program code, and the program code is executed by the processor, so that the wireless communications apparatus (or the base station) performs the method according to the first aspect.

In the method according to any one of the foregoing aspects, when the modulation scheme of the uplink data transmission is the π/2 BPSK, the base sequence configuration of the reference signal sequence corresponding to the π/2 BPSK is selected. The terminal generates the reference signal corresponding to the π/2 BPSK, and the base station receives the reference signal corresponding to the π/2 BPSK, to estimate the channel characteristic for the uplink data transmission. When the modulation scheme of the uplink data transmission is the another modulation scheme, the base sequence configuration of the reference signal sequence corresponding to the another modulation scheme is selected. The terminal generates the reference signal corresponding to the another modulation scheme, and the base station receives the reference signal corresponding to the another modulation scheme, to estimate the channel characteristic for the uplink data transmission. Therefore, the reference signal can be adaptively determined based on a change of the modulation scheme of the uplink data transmission, thereby improving wireless communication performance.

In an optional technical solution, the base sequence configuration of the reference signal sequence corresponding to the π/2 BPSK and the base sequence configuration of the reference signal sequence corresponding to the another modulation scheme are separately stored or set in the terminal and the base station. The base sequence configuration of the reference signal sequence is pre-stored or preset in the terminal in the optical technical solution, to help reduce transmission overheads.

In an optional technical solution, a cubic metric value of a dedicated demodulation reference signal generated based on the base sequence configuration of the reference signal sequence corresponding to the π/2 BPSK is less than a cubic metric value of a dedicated demodulation reference signal generated based on the base sequence configuration of the reference signal sequence corresponding to the another modulation scheme. Because the cubic metric value of the dedicated demodulation reference signal corresponding to the π/2 BPSK is relatively small in the optional technical solution, to help improve efficiency of a power amplifier of the terminal, and improve precision of channel estimation, thereby improving communication performance of a system.

In an optional technical solution, the base sequence configuration of the reference signal sequence corresponding to the π/2 BPSK includes a length value and a root value of a Zadoff-Chu sequence, and the reference signal sequence is generated based on the Zadoff-Chu sequence; and when a length of the reference signal sequence generated based on the Zadoff-Chu sequence is 6, the length value of the Zadoff-Chu sequence is 1511, and the root of the Zadoff-Chu sequence has one or more of the following values:

597, 598, 599, 600, 601, 602, 603, 604, 605, 606, 607, 608, 609, 610, 611, 900, 901, 902, 903, 904, 905, 906, 907, 908, 909, 910, 911, 912, 913, and 914.

In an optional technical solution, the base sequence configuration of the reference signal sequence corresponding to the π/2 BPSK includes a length value and a root value of a Zadoff-Chu sequence, and the reference signal sequence is generated based on the Zadoff-Chu sequence; and when a length of the reference signal sequence generated based on the Zadoff-Chu sequence is 12, the length value of the Zadoff-Chu sequence is 1277, and the root of the Zadoff-Chu sequence has one or more of the following values:

104, 105, 106, 107, 108, 109, 110, 111, 112, 113, 114, 115, 116, 117, 118, 1159, 1160, 1161, 1162, 1163, 1164, 1165, 1166, 1167, 1168, 1169, 1170, 1171, 1172, and 1173.

In an optional technical solution, the base sequence configuration of the reference signal sequence corresponding to the π/2 BPSK includes a length value and a root value of a Zadoff-Chu sequence, and the reference signal sequence is generated based on the Zadoff-Chu sequence; and when a length of the reference signal sequence generated based on the Zadoff-Chu sequence is 18, the length value of the Zadoff-Chu sequence is 1171, and the root of the Zadoff-Chu sequence has one or more of the following values:

59, 60, 61, 62, 63, 64, 65, 66, 67, 68, 69, 70, 71, 72, 73, 1098, 1099, 1100, 1101, 1102, 1103, 1104, 1105, 1106, 1107, 1108, 1109, 1110, 1111, and 1112.

In an optional technical solution, the base sequence configuration of the reference signal sequence corresponding to the π/2 BPSK includes a length value and a root value of a Zadoff-Chu sequence, and the reference signal sequence is generated based on the Zadoff-Chu sequence; and when a length of the reference signal sequence generated based on the Zadoff-Chu sequence is 24, the length value of the Zadoff-Chu sequence is 1213, and the root of the Zadoff-Chu sequence has one or more of the following values:

45, 46, 47, 48, 49, 50, 51, 52, 53, 54, 55, 56, 579, 580, 581, 632, 633, 634, 1157, 1158, 1159, 1160, 1161, 1162, 1163, 1164, 1165, 1166, 1167, and 1168.

In an optional technical solution, the base sequence configuration of the reference signal sequence corresponding to the π/2 BPSK includes a phase parameter value of a quadrature phase shift keying QPSK sequence, the reference signal sequence is generated based on the QPSK sequence, and an element value of the QPSK sequence meets the following equation:

$$X(n) = e^{j\varphi(n)\pi/4},$$

where $X(n)$ is an $n^{th}$ element of the QPSK sequence, j is an imaginary unit, $\varphi(n)$ is a phase parameter of the QPSK sequence, and when a length of a reference signal sequence generated based on the QPSK sequence is 6, a value of $\varphi(n)$ meets a row in the following table:

| $\varphi(0), \ldots, \varphi(5)$ | | | | | |
|---|---|---|---|---|---|
| 1 | 1 | 3 | −3 | 3 | 1 |
| 1 | 1 | −3 | −1 | −3 | 1 |
| 1 | −1 | 1 | −3 | −3 | 1 |
| 1 | 3 | 3 | 1 | −3 | 1 |
| 1 | 3 | −3 | 3 | 1 | 1 |
| 1 | −3 | 1 | 3 | 3 | 1 |
| 1 | −3 | −1 | −3 | 1 | 1 |
| 1 | −3 | −3 | 1 | −1 | 1 |
| −1 | 1 | −1 | 3 | 3 | −1 |
| −1 | −1 | 3 | 1 | 3 | −1 |
| −1 | −1 | −3 | 3 | −3 | −1 |
| −1 | 3 | −1 | −3 | −1 | −1 |
| −1 | 3 | −1 | −3 | −3 | −1 |
| −1 | 3 | 3 | −1 | 1 | −1 |
| −1 | −3 | 3 | −3 | −1 | −1 |
| −1 | −3 | −3 | −1 | 3 | −1 |
| 3 | 1 | 1 | 3 | −3 | 3 |
| 3 | 1 | 3 | −1 | −1 | 3 |
| 3 | 1 | −3 | 1 | 3 | 3 |
| 3 | −1 | 1 | −1 | 3 | 3 |
| 3 | −1 | −1 | 3 | 1 | 3 |
| 3 | −1 | −3 | −3 | −1 | 3 |
| 3 | 3 | 1 | −3 | 1 | 3 |
| 3 | 3 | −1 | 1 | −1 | 3 |
| 3 | −3 | −1 | −1 | −3 | 3 |
| 3 | −3 | 3 | 1 | 1 | 3 |
| −3 | 1 | 1 | −3 | −1 | −3 |
| −3 | 1 | −1 | 1 | −3 | −3 |
| −3 | 1 | 3 | 3 | 1 | −3 |
| −3 | −1 | −1 | −3 | 3 | −3 |

In an optional technical solution, the base sequence configuration of the reference signal sequence corresponding to the another modulation scheme includes the length value and the root value of the Zadoff-Chu sequence, and the reference signal sequence is generated based on the Zadoff-Chu sequence, where a length of the Zadoff-Chu sequence is 21157, and the root of the Zadoff-Chu sequence has one or more of the following values:

1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, and 20008.

In an optional technical solution, an element value of the Zadoff-Chu sequence meets the following equation:

$$X_q(m) = e^{-j\frac{\pi \cdot q \cdot m \cdot (m+1)}{N_{zc}}},$$

where m is an element sequence number of the Zadoff-Chu sequence, $0 \leq m \leq N_{zc}-1$, $X_q(m)$ is an $m_{th}$ element of the Zadoff-Chu sequence, $q$ is a root of the Zadoff-Chu sequence, $N_{zc}$ is the length of the Zadoff-Chu sequence, and j is an imaginary unit.

According to a seventh aspect, a wireless communications system is provided, including a base station, and the wireless communications apparatus according to any one of the third aspect, the fifth aspect, and various optional technical solutions.

According to an eighth aspect, a wireless communications system is provided, including a terminal, and the wireless communications apparatus according to any one of the fourth aspect, the sixth aspect, and various optional technical solutions.

According to a ninth aspect, a computer-readable storage medium is provided, the computer-readable storage medium stores program code, and when the program code is executed by a processor, the method according to any one of the first aspect, the second aspect, and various optional technical solutions is implemented.

According to a tenth aspect, a computer program product is provided, and when program code included in the computer program product is executed by a processor, the method according to any one of the first aspect, the second aspect, and various optional technical solutions is implemented.

It should be understood that the technical solutions in the seventh aspect to the tenth aspect are the same as or corresponding to the technical solutions in the first aspect to the sixth aspect. Therefore, for beneficial effects of the seventh aspect to the tenth aspect and the various optional technical solutions, refer to descriptions of beneficial effects of the first aspect to the sixth aspect and the various optional technical solutions. Details are not described herein again.

BRIEF DESCRIPTION OF DRAWINGS

FIG. 4-1 is a schematic diagram of a generation process of a reference signal sequence according to an embodiment of the present invention;

FIG. 4-2 is a schematic diagram of a generation process of a dedicated demodulation reference signal according to an embodiment of the present invention;

Figure 1:
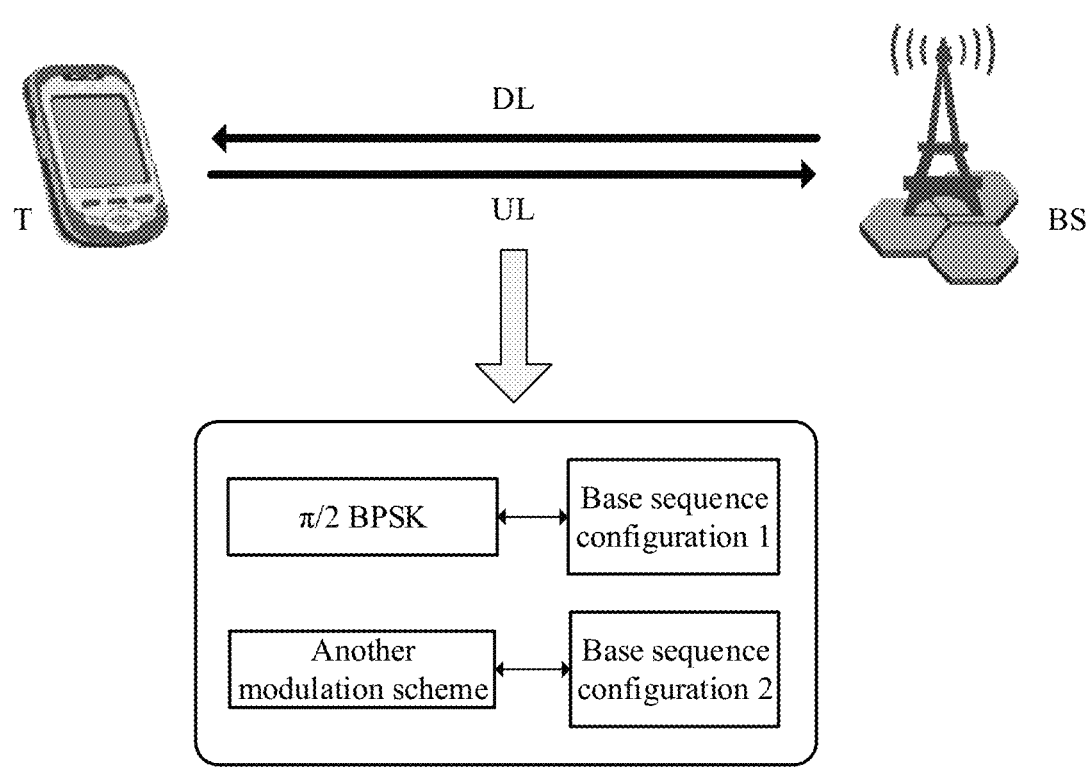
FIG. 1 is a schematic structural diagram of a wireless communications system according to an embodiment of the present invention.

It should be understood that, in the foregoing schematic structural diagrams, sizes and forms of modules are intended for reference only, and should not constitute a unique interpretation of embodiments of the present invention. Relative positions between the modules shown in the schematic structural diagrams only schematically represent a structural association between the modules, instead of limiting a physical connection manner in the embodiments of the present invention.

DESCRIPTION OF EMBODIMENTS

With reference to the accompanying drawings and embodiments, the following further describes technical solutions provided in this application. It should be understood that system architectures and service scenarios described in this application are mainly intended to describe possible implementations of the technical solutions of this application, and should not be construed as a unique limitation on the technical solutions of this application. A person of ordinary skill in the art may know that, with evolution of network architectures and emergence of new service scenarios, the technical solutions provided this application are also applicable to a similar technical problem.

In a wireless communications system, communications devices may be classified as devices that provide network services and devices that use the network services. Communications devices that provide the network services are generally devices that form a network, and may be referred to as network devices (network equipment) or network elements (network element). Network devices usually belong to network vendors, for example, operators (such as China Mobile and Vodafone) or infrastructure providers (such as China Tower), and are operated and maintained by these network vendors. Communications devices that use the network services are usually located on an edge of the network, and may be referred to as terminals. The terminal can be connected to the network device, and served by the network device, but does not necessarily belong to these network vendors. The terminal is usually closely associated with a user, and is occasionally referred to as user equipment (user equipment, UE), or a subscriber unit (subscriber unit, SU).

A mobile communications system is used as an example. A typical example of the terminal is a mobile phone (mobile phone). The mobile phone usually belongs to the user, can access a mobile communication network, and use a mobile communication service provided in the network. The mobile communication network may be further divided into a radio access network (radio access network, RAN) and a core network (core network, CN). Correspondingly, the network devices may be further classified as a RAN device and a CN device. The RAN device is mainly responsible for a radio-related function, and typical examples are a general NodeB (generation Node B, gNB) in a 5G system and an evolved NodeB (evolutional Node B, eNB or eNodeB) in a 4G system. The CN devices are mainly responsible for overall functions of the network, and are generally classified as a user plane (user plane, UP) device and a control plane (control plane) device. A user plane is mainly related to user data transmission. The user data is usually considered as a payload (payload) of a communication service, for example, data content that meets a user requirement, such as text, a voice, or a video. In this application, user plane data or user data is denoted as service data. A control plane is mainly related to transmission of control signaling. The control signaling is auxiliary overheads of service data transmission, but is crucial for ensuring efficiency and reliability of the service data transmission.

In this application, for ease of description, the following uses a base station (base station) and a terminal (terminal) as examples to describe in detail a wireless communication method, a wireless communications device, and a wireless communications system in the embodiments of the present invention. The base station refers to the network device in the wireless communications system, especially the RAN device. In addition to the UE or the SU in the wireless communications system, the terminal further includes a communications device having a radio access capability that is similar to that of the UE or the SU, for example, the network device such as a relay node (relay node, RN).

Generally, based on a data transmission direction on a communications link, a communications link from the base station to the terminal is referred to as a downlink (downlink, DL). Conversely, a communications link from the terminal to the base station is referred to as an uplink (uplink, UL).

From a perspective of a logic function, the base station may be understood as a scheduling entity (scheduling entity), and the terminal may be understood as a subordinate entity (subordinate entity). The scheduling entity is responsible for scheduling and controlling the service data transmission, and the subordinate entity performs the service data transmission under control of the scheduling entity. For example, the base station sends an uplink scheduling grant (grant) to the terminal, and the terminal sends uplink data to the base station based on the uplink scheduling grant.

From a perspective of a physical form, the base station may include but are not limited to a macro base station (macro base station), a micro base station (micro base station), a transmission reception point (transmission Reception Point, TRP), a baseband unit (baseband unit, BBU), and a remote radio unit (remote radio unit). The micro base station is also occasionally referred to as a small cell (small cell). The terminals may include but are not limited to a mobile phone, a tablet computer (tablet computer), a laptop computer (laptop computer), a wearable device (a smart watch, a smart band, a smart helmet, smart glasses, or the like), and other communications devices having a wireless access capability, such as various Internet of Things devices, including smart home devices (such as smart meters and smart appliances) and smart vehicles, and the like.

FIG. 1 is a schematic structural diagram of a wireless communications system according to an embodiment of the present invention. FIG. 1 shows a base station (denoted as BS) and a terminal (denoted as T). An uplink and a downlink between the base station and the terminal are respectively denoted as UL and DL. It should be understood that although one base station and one terminal are shown in FIG. 1, the wireless communications system may alternatively include another quantity of base stations and terminals, and may further include another network device.

It should be understood that a type of the wireless communications system is not limited in the technical solutions provided in this application. A mobile communications system is used as an example. The technical solutions provided in this application may be applied to not only a 5G mobile communications system and an evolved system of the 5G mobile communications system, but also a 4G long term evolution (LTE) system and an evolved system of the 4G LTE system.

In this embodiment of the present invention, the terminal and the base station in the wireless communications system support one or more radio access technologies (RAT), for example, a RAT of a 5G system and an evolved system of the 5G system, and/or a RAT of a 4G system and an evolved system of the 4G system. Specifically, the terminal and the base station each support an air interface parameter, a coding scheme, a modulation scheme, and the like in the RAT. The air interface parameter is a parameter used to describe a characteristic of the air interface. The air interface parameter is also occasionally referred to as numerology in English, and the air interface parameter usually includes parameters such as a subcarrier spacing (SC) and a cyclic prefix (CP).

In addition, the terminal and the base station also know various predefined configurations of the wireless communications system. These system-predefined configurations may be used as a part of a standard protocol of the wireless communications system, and may be further determined through interaction between the terminal and the base station. Some content of the standard protocol of the wireless communications system may be pre-stored in a memory of the terminal and a memory of the base station, and/or is embodied as a hardware circuit or software code of the terminal and the base station.

The modulation scheme may be understood as mapping between data information and a modulation symbol. Different values of a parameter such as a phase, an amplitude, or a frequency of the modulation symbol can reflect different data information. Without causing ambiguity, the modulation scheme in this application includes two inverse operations: modulation and demodulation. A process of setting a value of the parameter such as the phase, the amplitude, or the frequency of the modulation symbol based on the data information is referred to as a modulation operation. Correspondingly, a process of obtaining the data information based on the value of the parameter such as the phase or the amplitude of the modulation symbol is referred to as a demodulation operation.

For example, phase shift keying (PSK) is a modulation scheme in which the data information is transmitted based on the phase of the modulation symbol. Binary PSK (BPSK) is a binary form of the PSK, andquadrature phase shift keying (, QPSK) is a q-nary form of the PSK. Two phases with an interval of $\pi$ (or 180 degrees) are usually used to transmit information in the BPSK, and the BPSK is also referred to as 2PSK or 2-PSK.

Figure 2:
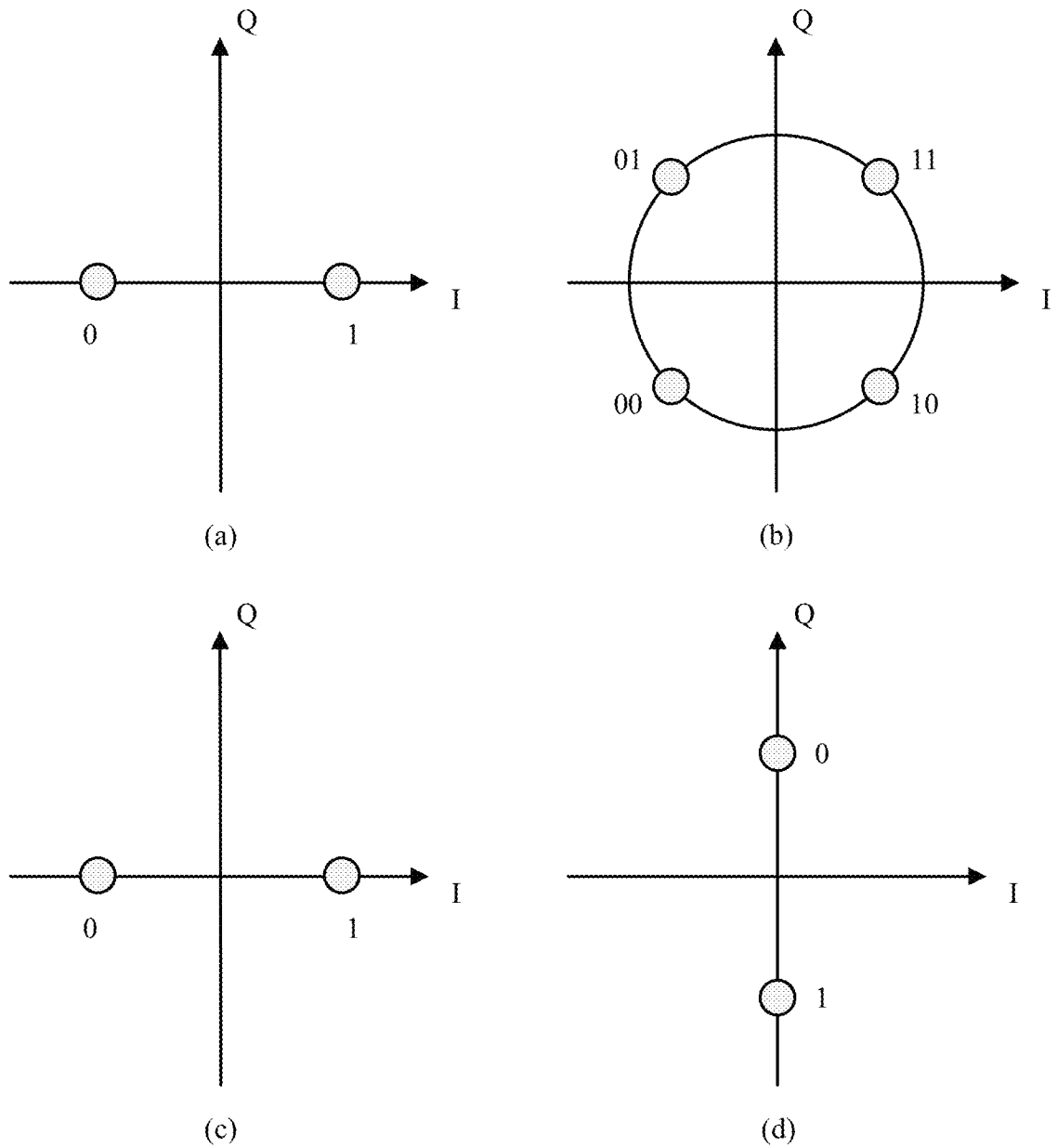
FIG. 2 is a schematic diagram of a principle of a modulation scheme according to an embodiment of the present invention.

FIG. 2 is a schematic diagram of a principle of a modulation scheme according to an embodiment of the present invention. FIG. 2(a) shows a constellation diagram (constellation diagram) of a modulation symbol of BPSK. A horizontal coordinate I represents an in phase component (in phase component), a vertical coordinate Q represents a quadrature component (quadrature component), and a solid dot in the constellation diagram represents a modulation symbol. As shown in FIG. 2(a), each modulation symbol of the BPSK has two possible phase values. Therefore, each modulation symbol may transmit 1-bit (bit) information. Similarly, four phases with an interval of $\pi/2$ (or 90 degrees) are usually used to transmit information in QPSK, and the QPSK is also referred to as 4PSK, 4-PSK, or 4-QAM (quadrature amplitude modulation, quadrature amplitude modulation). FIG. 2(b) shows a constellation diagram of a modulation symbol of the QPSK. As shown in FIG. 2(b), each modulation symbol of the QPSK has four possible phase values. Therefore, each modulation symbol may transmit 2-bit information.

Herein, $\pi/2$ BPSK is different from the BPSK and the QPSK. In a whole view, four phases with an interval of $\pi/2$ may be used to transmit information in the $\pi/2$ BPSK. However, in a micro view, two phases with an interval of $\pi$ are used for each modulation symbol to transmit information. In addition, a difference between phases of modulation symbols to which two adjacent bits are mapped is $\pi/2$. For example, it is assumed that a value set of a phase that can be used in the $\pi/2$ BPSK is $\{0, \pi/2, \pi, 3\pi/2\}$. As shown in FIG. 2(c), for bits in odd-numbered positions, the two phases 0 or $\pi$ may be used. As shown in FIG. 2(d), for bits in even-numbered positions, the two phases $\pi/2$ or $3\pi/2$ may be used. It can be easily learned that a difference between phases of two parity-adjacent modulation symbols is $\pi/2$ by comparing FIG. 2(c) and FIG. 2(d). Each modulation symbol has two possible phase values. Therefore, 1-bit information may be transmitted.

In this embodiment of the present invention, for uplink data transmission, the terminal and the base station each support a plurality of modulation schemes including the π/2 BPSK. It should be understood that content of carried data is not limited in the uplink data transmission. The uplink data transmission may be performed to carry service data or control signaling. When the uplink data transmission is performed to carry the service data, an uplink data link may be understood as a physical layer data channel of 5G NR or a PUSCH of 4G LTE. When the uplink data transmission is performed to carry the service data, an uplink data link may be understood as a physical layer control channel of the 5G NR or a PUCCH of the 4G LTE.

In this embodiment of the present invention, in addition to the π/2 BPSK, there are a plurality of other possible modulation schemes supported by the terminal and the base station. For example, the another modulation scheme may be one or more of the following modulation schemes: BPSK, QPSK, 16QAM, 64QAM, 256QAM, and 1024QAM. In addition, the modulation scheme supported by the terminal and the base station is not limited to the foregoing modulation schemes given as examples, and may further include variations of the foregoing modulation schemes given as examples, for example, offset quadrature phase shift keying (offset QPSK, OQPSK) and differential phase shift keying (differential PSK, DPSK).

Particularly, in this embodiment of the present invention, the π/2 BPSK is different from the another modulation scheme, and base sequence (base sequence) configurations of reference signal sequences are respectively provided for the π/2 BPSK and the another modulation scheme. A base sequence of the reference signal sequence is a basic sequence (basic sequence) used to generate the reference signal sequence. A basic sequence configuration is denoted as the base sequence configuration. The base sequence configuration may include a type, a generation formula, a parameter value, or an element value of the basic sequence.

Specifically, in the wireless communications system in this embodiment of the present invention, when a modulation scheme of the uplink data transmission is the π/2 BPSK, a base sequence configuration of a reference signal sequence corresponding to the π/2 BPSK is selected. The terminal generates a reference signal corresponding to the π/2 BPSK, and the base station receives the reference signal corresponding to the π/2 BPSK, to estimate a channel characteristic for the uplink data transmission. When the modulation scheme of the uplink data transmission is the another modulation scheme, a base sequence configuration of a reference signal sequence corresponding to the another modulation scheme is selected. The terminal generates a reference signal corresponding to the another modulation scheme, and the base station receives the reference signal corresponding to the another modulation scheme, to estimate the channel characteristic for the uplink data transmission.

In comparison, first, an existing LTE system does not support the π/2 BPSK, and if a reference signal of the LTE system is simply used, the communications system may not normally work or communication performance of the system may deteriorate. Second, although the existing LTE system also supports a plurality of modulation schemes, base sequence configurations of reference signal sequences are mainly distinguished based on lengths of the base sequences other than the modulation scheme of the uplink data transmission. When the terminal or the base station determines a dedicated demodulation reference signal of the uplink data transmission, the length of the base sequence is mainly used for reference, and the modulation scheme of the uplink data transmission does not need to be considered. Therefore, compared with that in the prior art, the wireless communications system in this embodiment of the present invention can adaptively determine a reference signal based on a change of the modulation scheme of the uplink data transmission, thereby improving wireless communication performance.

In an optional implementation, the base sequence configuration of the reference signal sequence corresponding to the π/2 BPSK and the base sequence configuration of the reference signal sequence corresponding to the another modulation scheme may be separately stored or set in the terminal and the base station. For example, the base sequence configurations of the reference signal sequences separately corresponding to the π/2 BPSK and the another modulation scheme are stored or set in the terminal and the base station during manufacture processes of the terminal and the base station, or are stored or set in the terminal and the base station in a software upgrade manner after a delivery, In addition, in another optional implementation, the base sequence configurations of the reference signal sequences that are respectively corresponding to the π/2 BPSK and the another modulation scheme in the terminal may be further set or updated by using control signaling of the base station in a process of using the terminal. The base sequence configuration of the reference signal sequence is pre-stored or preset in the terminal, thereby reducing transmission overheads. The base sequence configuration of the reference signal sequence is set or updated by using the control signaling of the base station, thereby improving flexibility of the base sequence configuration.

The reference signal in this embodiment of the present invention may be a dedicated demodulation reference signal, or may be another type of reference signal, for example, a sounding reference signal or a positioning reference signal. Without loss of generality, the following uses the dedicated demodulation reference signal as an example to further describe the solution in this embodiment of the present invention.

For example, in the wireless communications system in this embodiment of the present invention, the terminal is configured to: determine a base sequence configuration of a reference signal sequence corresponding to the modulation scheme of the uplink data transmission, generate a dedicated demodulation reference signal based on the determined base sequence configuration of the reference signal sequence, and send the dedicated demodulation reference signal. The base station is configured to: receive a dedicated demodulation reference signal associated with the uplink data transmission, and determine the base sequence configuration of the reference signal sequence corresponding to the modulation scheme of the uplink data transmission, to estimate the channel characteristic for the uplink data transmission.

Figure 3:
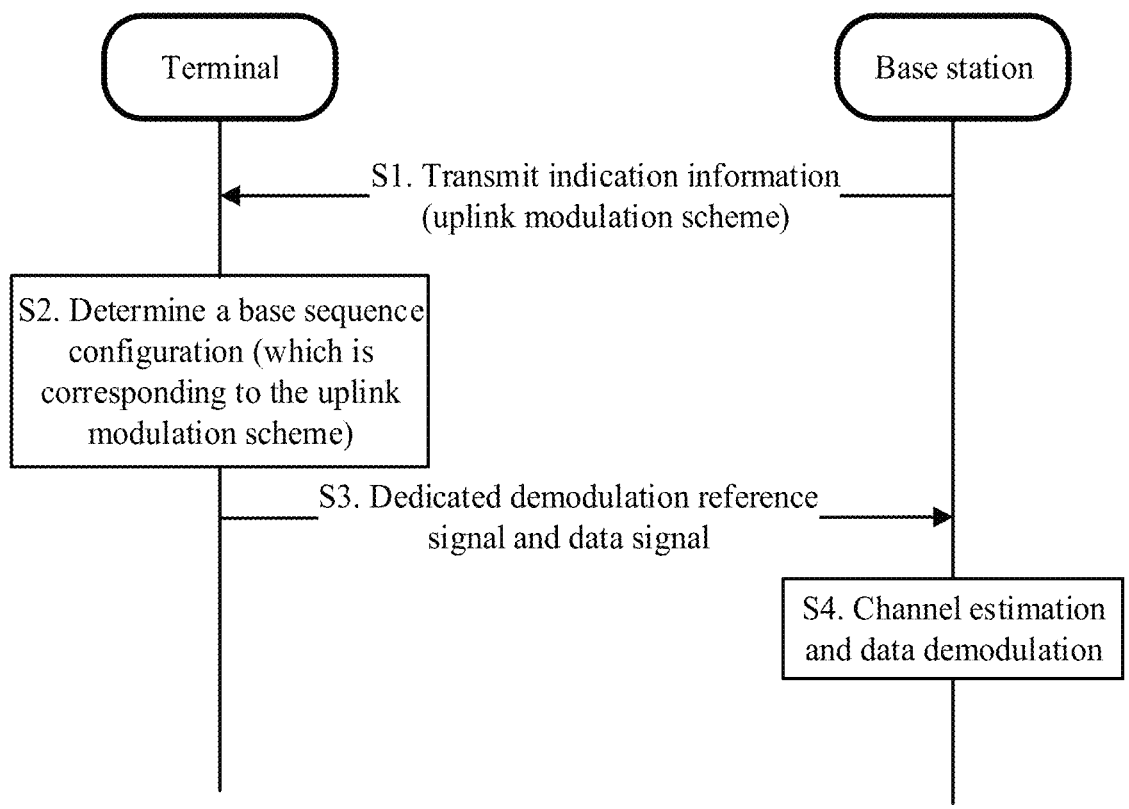
FIG. 3 is a schematic flowchart of a wireless communication method according to an embodiment of the present invention.

Based on the wireless communications system shown in FIG. 1, in an embodiment of the present invention, a wireless communication method used between a terminal and a base station is further described with reference to FIG. 3. FIG. 3 is a schematic flowchart of a wireless communication method according to an embodiment of the present invention. Directions of horizontal lines between the base station and the terminal represent transmission directions, text on the horizontal lines represents schematic names of transmitted information or transmitted signals, and text in blocks represents schematic names of internal operations of the terminal or the base station.

As shown in FIG. 3, the wireless communication method may include the following steps.

Step S1: A base station sends indication information of uplink data transmission, and correspondingly, a terminal receives the indication information of the uplink data transmission. The indication information of the uplink data transmission is used to indicate a modulation scheme of the uplink data transmission. In FIG. 3, an arrow of a horizontal line of step S1 points from the base station to the terminal, and is used to represent a downlink direction. The modulation scheme of the uplink data transmission is briefly denoted as an uplink modulation scheme.

Step S2: The terminal determines a base sequence configuration of a reference signal sequence corresponding to the modulation scheme of the uplink data transmission, and generates a dedicated demodulation reference signal based on the determined base sequence configuration of the reference signal sequence. In FIG. 3, step S2 is briefly denoted as "Determine a base sequence configuration (which is corresponding to the uplink modulation scheme)" in a block.

Step S3: The terminal sends the dedicated demodulation reference signal, and correspondingly, the base station receives a dedicated demodulation reference signal associated with the uplink data transmission. In FIG. 3, an arrow of a horizontal line of step S3 points from the terminal to the base station, and is used to represent an uplink direction. Step S3 is briefly denoted as "dedicated demodulation reference signal and data signal" transmitted in the uplink direction. The data signal may be or may not be sent.

Step S4: The base station estimates a channel characteristic for the uplink data transmission, and the estimated channel characteristic may be used to demodulate an uplink data signal. In FIG. 3, step S4 is briefly denoted as "channel estimation and data demodulation" in a block. The step of the data demodulation may be or may not be performed. It should be understood that, to estimate the channel characteristic for the uplink data transmission, the base station also needs to determine the base sequence configuration of the reference signal sequence corresponding to the modulation scheme of the uplink data transmission and a corresponding reference signal sequence.

Particularly, in the wireless communication method shown in FIG. 3, the modulation scheme of the uplink data transmission is one of a plurality of modulation schemes supported by the terminal, and the plurality of modulation schemes include at least $\pi/2$ BPSK. A base sequence configuration of a reference signal sequence corresponding to the $\pi/2$ BPSK is different from a base sequence configuration of a reference signal sequence corresponding to another modulation scheme in the plurality of modulation schemes.

Because the base sequence configuration of the reference signal sequence corresponding to the $\pi/2$ BPSK is different from the base sequence configuration of the reference signal sequence corresponding to the another modulation scheme, the terminal and the base station each may adaptively determine the base sequence configuration of the reference signal sequence corresponding to the modulation scheme of the uplink data transmission based on the modulation scheme of the uplink data transmission. Then based on the determined base sequence configuration, the terminal may generate the reference signal sequence corresponding to the modulation scheme of the uplink data transmission and the dedicated demodulation reference signal, and the base station may also determine the reference signal sequence corresponding to the modulation scheme of the uplink data transmission, to estimate the channel characteristic for the uplink data transmission. Therefore, in the wireless communication method shown in FIG. 3, the corresponding dedicated demodulation reference signal can be adaptively adjusted based on the modulation scheme of the uplink data transmission, to help improve precision of channel estimation, thereby improving communication performance of a system.

In an optional implementation, a cubic metric value of a dedicated demodulation reference signal generated based on the base sequence configuration of the reference signal sequence corresponding to the $\pi/2$ BPSK is less than a cubic metric value of a dedicated demodulation reference signal generated based on the base sequence configuration of the reference signal sequence corresponding to the another modulation scheme.

In the optional implementation, the cubic metric value of the dedicated demodulation reference signal corresponding to the $\pi/2$ BPSK is less than the cubic metric value of the dedicated demodulation reference signal corresponding to the another modulation scheme. When the $\pi/2$ BPSK is used for the uplink data transmission, because the cubic metric value of the dedicated demodulation reference signal corresponding to the $\pi/2$ BPSK is relatively small, efficiency of a power amplifier of the terminal is improved, and precision of channel estimation is also improved, thereby improving communication performance of a system.

The following further describes the solution in this embodiment of the present invention with reference to optional embodiments. It should be understood that content of the following optional embodiments is mainly used to provide supplementary description of some optional implementations of the embodiments of the present invention, and the scope of the embodiments of the present invention should not be limited to these optional embodiments. It should be understood that these optional embodiments may be randomly combined, and may be combined with the wireless communications system and the wireless communication method to jointly construct the content of the embodiments of the present invention.

Embodiment 1 describes some optional implementations of the wireless communication method shown in FIG. 3 from an overall perspective. Based on Embodiment 1, examples of more details are provided in subsequent optional embodiments. Especially, an example of the base sequence configuration of the reference signal sequences respectively corresponding to the $\pi/2$ BPSK and the another modulation scheme, and an example of a corresponding reference signal sequence are provided.

Embodiment 1

In step S1 of the wireless communication method shown in FIG. 3, the indication information of the uplink data transmission may be carried in a downlink control plane message. The indication information of the uplink data transmission may be embodied as one or more information elements (information element, IE) in the downlink control plane message. The IE may be understood as a predefined field in the downlink control plane message, and a possible value and a meaning of the field are pre-specified in a standard protocol. The indication information may be further used to indicate another piece of information of the uplink data transmission such as a coding scheme in addition to the modulation scheme of the uplink data transmission. For example, the indication information includes an index of a modulation and coding scheme (modulation and coding scheme, MCS), and the index jointly indicates the modulation scheme and the coding scheme of the uplink data transmission.

It should be understood that, although the terminal determines the modulation scheme of the uplink data transmission based on the indication information in step S1, for some particular uplink data transmission, the terminal and the base station may alternatively determine, based on a predefined configuration of a system, modulation schemes of such particular uplink data transmission. In this case, step S1 is an optional step.

In an optional implementation, the base station notifies the terminal of a configuration of the uplink data transmission by using the downlink control plane message. The downlink control plane message includes downlink control information (downlink control information, DCI), a radio resource control (radio resource control, RRC) message, and the like. The terminal receives the downlink control plane message, and learns the configuration of the uplink data transmission. In this embodiment of the present invention, the configuration of the uplink data transmission may include a resource, the coding scheme, and the modulation scheme that are used for the uplink data transmission.

Then, in step S3, the terminal may send the uplink data signal and the dedicated demodulation reference signal based on the configuration of the uplink data transmission. The uplink data signal and the dedicated demodulation reference signal may be embodied as a baseband signal or a radio frequency signal in the terminal, and may be embodied as an electromagnetic wave signal on an air interface between the terminal and the base station. It should be understood that, in this application, without causing ambiguity, the uplink data transmission and the uplink data signal may be interchangeably used sometimes.

In step S2 and step S4, the terminal and the base station each need to separately determine the base sequence configuration of the reference signal sequence corresponding to the modulation scheme of the uplink data transmission, to generate the corresponding dedicated demodulation reference signal (by the terminal) or estimate the channel characteristic for the uplink data transmission (by the base station).

Specifically, when the modulation scheme of the uplink data transmission is the $\pi/2$ BPSK, the terminal and the base station each separately determine the base sequence configuration of the reference signal sequence corresponding to the $\pi/2$ BPSK. When the modulation scheme of the uplink data transmission is the another modulation scheme, the terminal and the base station each separately determine the base sequence configuration of the reference signal sequence corresponding to the another modulation scheme.

Then, the terminal generates the corresponding reference signal sequence and the corresponding dedicated demodulation reference signal based on the determined base sequence configuration of the reference signal sequence. Based on the determined base sequence configuration of the reference signal sequence, the base station further determines a reference signal sequence to be received in expectation. The base station compares the reference signal sequence to be received in expectation with a reference signal sequence in an actually received dedicated demodulation reference signal, to estimate the channel characteristic for the uplink data transmission. Finally, the base station may perform demodulation for the uplink data transmission based on the estimated channel characteristic.

Figures 1, 4:
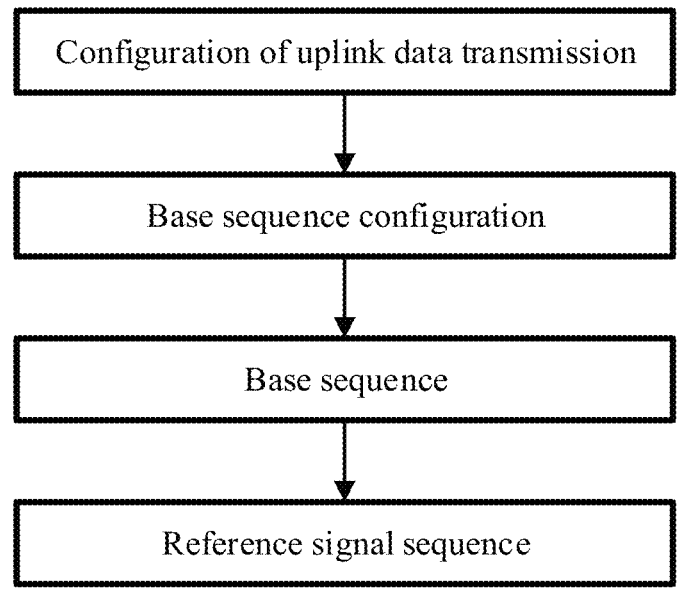
Figures 2, 4:
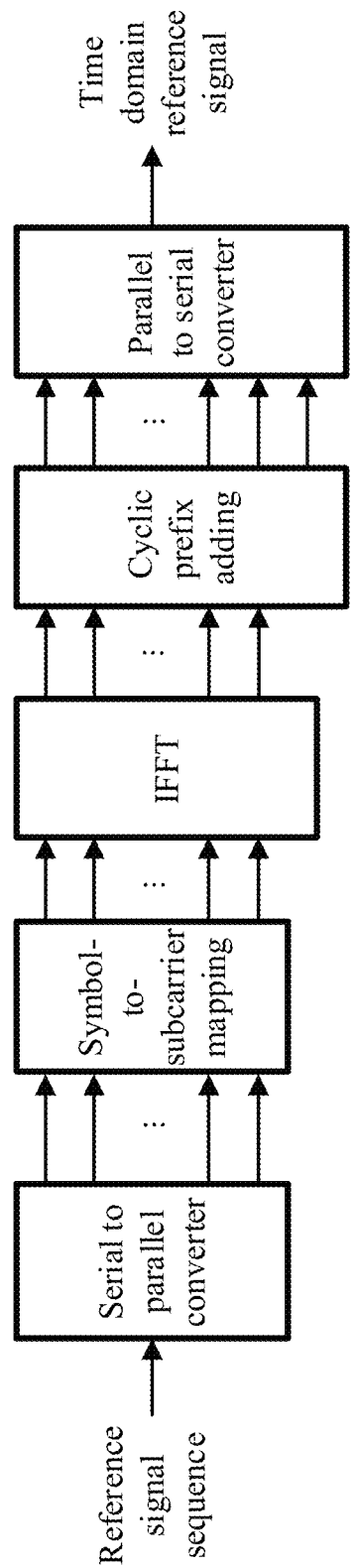

In this embodiment, generation processes of the reference signal sequence and the dedicated demodulation reference signal in this embodiment of the present invention are further described with reference to FIG. 4-1 and FIG. 4-2. FIG. 4-1 is a schematic diagram of a generation process of the reference signal sequence according to an embodiment of the present invention. FIG. 4-2 is a schematic diagram of a generation process of a dedicated demodulation reference signal according to an embodiment of the present invention.

As shown in FIG. 4-1, in an optional implementation, the terminal and the base station each first separately determine the configuration of the uplink data transmission, and the configuration of the uplink data transmission includes an uplink modulation scheme, and may further include another configuration (for example, a frequency resource). Based on this, the terminal and the base station each separately select a base sequence configuration corresponding to the uplink modulation scheme based on the configuration of the uplink data transmission. Then, the terminal and the base station each generate a corresponding base sequence based on the determined base sequence configuration. Finally, the terminal and the base station each generate a corresponding reference signal sequence based on the base sequence. For a method in which the terminal and the base station each generate the corresponding reference signal sequence based on the base sequence, refer to mathematical operations in a standard. These mathematical operations include but are not limited to a cyclic shift and orthogonalization, and specific operation types and parameters depend on a definition in the system. This is not specifically limited in this embodiment of the present invention.

After obtaining the reference signal sequence, the terminal further converts the reference signal sequence into a time domain reference signal, and sends the time domain reference signal to the base station. The reference signal sequence is carried in the time domain reference signal. As shown in FIG. 4-2, in an optional implementation, the reference signal sequence is converted into the time domain reference signal after traversing a serial to parallel converter, symbol-to-subcarrier mapping, inverse fast Fourier transform (inverse fast fourier transformation, IFFT), cyclic prefix adding, and a parallel to serial converter.

Embodiment 2

In this embodiment, a base sequence configuration of a reference signal sequence corresponding to $\pi/2$ BPSK includes a length value and a root value of a Zadoff-Chu sequence. For specific content, refer to the following description. A base sequence configuration in an existing LTE system may be still used as a base sequence configuration of a reference signal sequence corresponding to another modulation scheme.

The Zadoff-Chu sequence is a complex-valued mathematical sequence, and meets a constant amplitude zero auto-correlation (constant amplitude zero autocorrelation, CAZAC) characteristic. Amplitude values of elements in the Zadoff-Chu sequence are the same, to help generate a radio signal with a relatively low peak to average power ratio (peak to average power ratio, PAPR). A related function of the Zadoff-Chu sequence and a circularly shifted version (circularly shifted version) of the Zadoff-Chu sequence is a delta function, and a peak position of the delta function depends on a value of the cyclic shift. A plurality of orthogonal sequences may be obtained after different types of cyclic shifting are performed on a same Zadoff-Chu sequence. A Zadoff-Chu sequence on which cyclic shifting is not performed is denoted as a root sequence (root sequence).

Specifically, a Zadoff-Chu sequence $ZC_q$ of a root $q$ may be expressed as the following equation:

$$ZC_q(n) = e^{-j\frac{\pi \cdot q \cdot n \cdot (n+1+2l)}{N_{zc}}},$$

where j is an imaginary unit, q is the root of the Zadoff-Chu sequence, $q \in \{1, \ldots, N_{ZC}-1\}$, n is an element sequence number of the Zadoff-Chu sequence, $n=0, 1, \ldots, N_{ZC}-1$, $N_{zc}$ is the length of the Zadoff-Chu sequence, and l is an integer.

Without loss of generality, l=0 is used as an example for description in this embodiment. It should be understood that l may have another value. In this embodiment, an element value of the Zadoff-Chu sequence meets the following equation:

$$X_q(m) = e^{-j\frac{\pi \cdot q \cdot m \cdot (m+1)}{N_{zc}}},$$

where $X_q(m)$ is an $m_{th}$ element of the Zadoff-Chu sequence, m is an integer, and $0 \leq m \leq N_{zc}-1$.

In the existing LTE system, a same base sequence configuration of the reference signal sequence is used in the plurality of modulation schemes supported by the terminal and the base station. In other words, base sequence configurations of reference signal sequences in the LTE system are not distinguished based on the modulation scheme. In a technical specification of the 3rd generation partnership project (3rd generation partnership project, 3GPP), these base sequence configurations are classified into two types based on lengths of the base sequences. When a length of a base sequence is greater than or equal to $3N_{sc}^{RB}$, the base sequence is an extended sequence based on the Zadoff-Chu sequence. In this case, in the base sequence configuration, the length value of the Zadoff-Chu sequence is a maximum prime number (prime number) that is less than or equal to a length of a reference signal sequence. When a length of a base sequence is less than $3N_{sc}^{RB}$, the base sequence is a sequence based on QPSK. In this case, in the base sequence configuration, a value of a phase parameter of a QPSK sequence is pre-appointed in the 3GPP technical specification. $N_{sc}^{RB}$ is a quantity of subcarriers (subcarrier, SC) included in a resource block (resource block, RB) in the LTE system, and usually has a value of 12. For a detailed process of generating a reference signal based on the base sequence configuration, refer to a related 3GPP technical specification, for example, content of the reference signal in a section 5.5 in 3GPP TS 36.211 version 11.4.0.

It should be noted that, the length of the Zadoff-Chu sequence in the existing LTE system is less than or equal to the length of the reference signal sequence, and therefore, a cyclic extension (cyclic extension) of the Zadoff-Chu sequence may be used as a base sequence of the reference signal sequence. In contrast, in this embodiment, a length of the Zadoff-Chu sequence corresponding to the π/2 BPSK is greater than the length of the reference signal sequence, and therefore, truncation (truncation) or a segment (segment) of the Zadoff-Chu sequence, namely, some elements of the Zadoff-Chu sequence, may be used as the base sequence of the reference signal sequence. The reference signal sequence is also generated based on the Zadoff-Chu sequence, in this sense, the Zadoff-Chu sequence may alternatively be considered as the base sequence of the reference signal sequence. For unified description, the following describes the technical solution in this embodiment of the present invention by still using the some elements of the Zadoff-Chu sequence as the base sequence of the reference signal sequence.

It should be understood that a manner of obtaining the base sequence from the Zadoff-Chu sequence is not limited to a truncation or segmentation manner. In an optional implementation, the terminal or the base station may alternatively first generate a Zadoff-Chu sequence with a complete length, and then select some elements as the base sequence of the reference signal sequence. A length (namely, a quantity of some elements) of the base sequence is equal to a length of the reference signal sequence, and specifically selected elements may be determined based on a resource position occupied by the dedicated demodulation reference signal in entire system bandwidth. In another optional implementation, the terminal may alternatively directly generate several elements of the Zadoff-Chu sequence, and the several elements are used as the base sequence of the reference signal sequence, without a need to generate the Zadoff-Chu sequence with a complete length. In addition, the Zadoff-Chu sequence with the complete length or the several elements of the Zadoff-Chu sequence may alternatively be pre-stored in the terminal, to reduce overheads for generating the base sequence of the reference signal sequence in real time.

In this embodiment, the terminal and the base station each may determine, based on an uplink data transmission resource, the length of the reference signal sequence, and further determine the length of the base sequence of the reference signal sequence. Generally, the length of the reference signal sequence is equal to a total quantity of minimum frequency resource elements (such as subcarriers) included in a frequency resource for the uplink data transmission, and the length of the base sequence is equal to the length of the reference signal sequence. Certainly, in this embodiment, a case in which the length of the reference signal sequence and the length of the base sequence of the reference signal sequence are less than the total quantity of resource elements (such as subcarriers) of the minimum frequency included in the frequency resources for the uplink data transmission is not excluded. For example, the length of the reference signal sequence and the length of the base sequence of the reference signal sequence are one half, one third, or the like of the total quantity of subcarriers.

With reference to the length of the reference signal sequence, the following separately describes the length value and the root value of the Zadoff-Chu sequence corresponding to the π/2 BPSK, and describes how to generate the corresponding reference signal sequence by using examples.

For example, it is assumed that the length of the reference signal sequence is 12, in an optional implementation, a value of a length $N_{zc}$ of a corresponding Zadoff-Chu sequence is 1277, and a root q may have one or more of the following values: 104, 105, 106, 107, 108, 109, 110, 111, 112, 113, 114, 115, 116, 117, 118, 1159, 1160, 1161, 1162, 1163, 1164, 1165, 1166, 1167, 1168, 1169, 1170, 1171, 1172, and 1173.

Specifically, the terminal or the base station determines the length $N_{zc}=1277$ of the corresponding Zadoff-Chu sequence based on the modulation scheme π/2 BPSK of the uplink data transmission and the length 12 of the reference signal sequence. Then the terminal or the base station may determine the value of the root q of the Zadoff-Chu sequence based on configurations in the system, for example, system parameters such as a cell identity (cell identity) and a slot number. It is assumed that the terminal or the base station determines that q=104; and an element value of the Zadoff-Chu sequence meets the following equation:

$$X_{104}(m) = e^{-j\frac{\pi \cdot 104 \cdot m \cdot (m+1)}{1277}}.$$

Herein, m is an integer, and 0≤m≤1276. A specific value of m may be determined based on factors such as the length of the reference signal sequence and a frequency resource position of the reference signal sequence. This is not limited herein. A sequence including these elements of the Zadoff-Chu sequence is denoted as the base sequence of the reference signal sequence. When the length of the base sequence is the same as that of the reference signal sequence, 12 elements of the Zadoff-Chu sequence are selected as the base sequence. The base sequence may be directly used as the reference signal sequence, or the reference signal sequence may alternatively be obtained by performing a specific mathematical operation. In an implementation, the 12 elements m=0, 1, . . . , 11 are selected as the base sequence by default. In another implementation, the 12 elements are selected as the base sequence based on a resource position occupied by the reference signal sequence in entire system bandwidth. For example, it is assumed that the system bandwidth is 50 RBs, and subcarriers in the system bandwidth are denoted as $\{SC_0, SC_1, \ldots, SC_{599}\}$, and subcarriers of 1 RB allocated by the base station for the uplink data transmission are denoted as $\{SC_{12}, SC_{13}, \ldots, SC_{23}\}$. In this case, m=12, 13, . . . , 23.

It should be understood that the length value 1277 of the Zadoff-Chu sequence is only an optional implementation, and this embodiment is not limited thereto. In another optional implementation, there may be further a plurality of other possible length values and root values of the Zadoff-Chu sequence. For example, the length value of the Zadoff-Chu sequence is 179, and the root of the Zadoff-Chu sequence has one or more of the following values: 13, 14, 15, 16, 17, 18, 40, 54, 55, 65, 66, 80, 81, 82, 83, 96, 97, 98, 99, 113, 114, 124, 125, 139, 161, 162, 163, 164, 165, and 166. Alternatively, the length value of the Zadoff-Chu sequence is 163, and the root of the Zadoff-Chu sequence has one or more of the following values: 11, 12, 13, 14, 15, 16, 17, 36, 49, 50, 59, 60, 61, 73, 74, 75, 88, 89, 90, 102, 103, 104, 113, 114, 127, 146, 147, 148, 149, and 150.

It should be understood that the length 12 of the reference signal sequence is only one possibility. In this embodiment, the reference signal sequence may further have a plurality of other possible lengths. The length of the reference signal sequence may be greater than or less than 12. For details, refer to the following examples. A reference signal sequence with each length may have a length value and a root value of a corresponding Zadoff-Chu sequence. In addition, in consideration of configuration integrity, the base sequence configuration in this embodiment may include all length values and root values of Zadoff-Chu sequences corresponding to these reference signal sequences with different lengths.

For example, it is assumed that the length of the reference signal sequence is 6, and there are at least the following several optional implementations for the length value and the root value of the Zadoff-Chu sequence:

The length value of the Zadoff-Chu sequence is 1511, and the root of the Zadoff-Chu sequence has one or more of the following values: 597, 598, 599, 600, 601, 602, 603, 604, 605, 606, 607, 608, 609, 610, 611, 900, 901, 902, 903, 904, 905, 906, 907, 908, 909, 910, 911, 912, 913, and 914.

Alternatively, the length value of the Zadoff-Chu sequence is 109, and the root of the Zadoff-Chu sequence has one or more of the following values: 15, 16, 17, 18, 19, 20, 21, 22, 23, 24, 25, 42, 43, 44, 45, 64, 65, 66, 67, 84, 85, 86, 87, 88, 89, 90, 91, 92, 93, and 94.

Alternatively, the length value of the Zadoff-Chu sequence is 83, and the root of the Zadoff-Chu sequence has one or more of the following values: 11, 12, 13, 14, 15, 16, 17, 18, 19, 20, 31, 32, 33, 34, 35, 48, 49, 50, 51, 52, 63, 64, 65, 66, 67, 68, 69, 70, 71, and 72.

Alternatively, the length value of the Zadoff-Chu sequence is 73, and the root of the Zadoff-Chu sequence has one or more of the following values: 9, 10, 11, 12, 13, 14, 15, 16, 17, 18, 27, 28, 29, 30, 31, 42, 43, 44, 45, 46, 55, 56, 57, 58, 59, 60, 61, 62, 63, and 64.

For example, it is assumed that the length of the reference signal sequence is 18, and there are at least the following several optional implementations for the length value and the root value of the Zadoff-Chu sequence:

The length value of the Zadoff-Chu sequence is 1171, and the root of the Zadoff-Chu sequence has one or more of the following values: 59, 60, 61, 62, 63, 64, 65, 66, 67, 68, 69, 70, 71, 72, 73, 1098, 1099, 1100, 1101, 1102, 1103, 1104, 1105, 1106, 1107, 1108, 1109, 1110, 1111, and 1112.

Alternatively, the length value of the Zadoff-Chu sequence is 239, and the root of the Zadoff-Chu sequence has one or more of the following values: 11, 12, 13, 14, 15, 37, 51, 56, 63, 74, 75, 84, 85, 112, 113, 126, 127, 154, 155, 164, 165, 176, 183, 188, 202, 224, 225, 226, 227, and 228.

Alternatively, the length value of the Zadoff-Chu sequence is 181, and the root of the Zadoff-Chu sequence has one or more of the following values: 8, 9, 10, 11, 12, 28, 42, 48, 56, 57, 64, 70, 75, 85, 86, 95, 96, 106, 111, 117, 124, 125, 133, 139, 153, 169, 170, 171, 172, and 173.

Alternatively, the length value of the Zadoff-Chu sequence is 163, and the root of the Zadoff-Chu sequence has one or more of the following values: 7, 8, 9, 10, 11, 25, 35, 38, 43, 51, 57, 58, 63, 76, 77, 86, 87, 100, 105, 106, 112, 120, 125, 128, 138, 152, 153, 154, 155, and 156.

For example, it is assumed that the length of the reference signal sequence is 24, and there are at least the following several optional implementations for the length value and the root value of the Zadoff-Chu sequence:

The length value of the Zadoff-Chu sequence is 1213, and the root of the Zadoff-Chu sequence has one or more of the following values: 45, 46, 47, 48, 49, 50, 51, 52, 53, 54, 55, 56, 579, 580, 581, 632, 633, 634, 1157, 1158, 1159, 1160, 1161, 1162, 1163, 1164, 1165, 1166, 1167, and 1168.

Alternatively, the length value of the Zadoff-Chu sequence is 181, and the root of the Zadoff-Chu sequence has one or more of the following values: 6, 7, 8, 9, 27, 29, 38, 43, 47, 58, 63, 71, 74, 79, 86, 87, 94, 95, 102, 107, 110, 118, 123, 134, 138, 143, 152, 154, 172, and 173.

Alternatively, the length value of the Zadoff-Chu sequence is 179, and the root of the Zadoff-Chu sequence has one or more of the following values: 6, 7, 8, 21, 43, 47, 50, 57, 62, 66, 70, 73, 78, 85, 86, 93, 94, 101, 106, 109, 113, 117, 122, 129, 132, 136, 158, 171, 172, and 173.

Alternatively, the length value of the Zadoff-Chu sequence is 151, and the root of the Zadoff-Chu sequence has one or more of the following values: 5, 6, 7, 24, 29, 36, 39, 42, 48, 53, 59, 62, 66, 72, 73, 78, 79, 85, 89, 92, 98, 103, 109, 112, 115, 122, 127, 144, 145, and 146.

It should be understood that, in this embodiment, for a method of generating a corresponding base sequence and reference signal sequence based on the length value and the root value of the Zadoff-Chu sequence in another optional implementation, refer to the example in which $N_{zc}$=1277 and q=104. Details are not described in this embodiment again.

Embodiment 3

In this embodiment, a base sequence configuration of a reference signal sequence corresponding to π/2 BPSK includes a value of a phase parameter of a QPSK sequence. A base sequence configuration in an existing LTE system may be still used as a base sequence configuration of a reference signal sequence corresponding to another modulation scheme. For details, refer to the description in Embodiment 1.

In this embodiment, the reference signal sequence is generated based on the QPSK sequence, and an element value of the QPSK sequence meets the following equation:

$$X(n)=e^{j\varphi(n)\pi/4}.$$

Herein, X(n) is an $n_{th}$ element of the QPSK sequence, a value of n is a length of the reference signal sequence, j is an imaginary unit, and φ(n) is a phase parameter of the QPSK sequence. In this implementation, the length of the reference signal sequence generated based on the QPSK sequence is 6, a value of φ(n) meets a row in the following Table 1:

TABLE 1

| φ(0), . . . , φ(5) | | | | | |
|---|---|---|---|---|---|
| 1 | 1 | 3 | −3 | 3 | 1 |
| 1 | 1 | −3 | −1 | −3 | 1 |
| 1 | −1 | 1 | −3 | −3 | 1 |
| 1 | 3 | 3 | 1 | −3 | 1 |
| 1 | 3 | −3 | 3 | 1 | 1 |
| 1 | −3 | 1 | 3 | 3 | 1 |
| 1 | −3 | −1 | −3 | 1 | 1 |
| 1 | −3 | −3 | 1 | −1 | 1 |
| −1 | 1 | −1 | 3 | 3 | −1 |
| −1 | −1 | 3 | 1 | 3 | −1 |
| −1 | −1 | −3 | 3 | −3 | −1 |
| −1 | 3 | −1 | −3 | −1 | −1 |
| −1 | 3 | −1 | −3 | −3 | −1 |
| −1 | 3 | 3 | −1 | 1 | −1 |
| −1 | −3 | 3 | −3 | −1 | −1 |
| −1 | −3 | −3 | −1 | 3 | −1 |
| 3 | 1 | 1 | 3 | −3 | 3 |
| 3 | 1 | 3 | −1 | −1 | 3 |
| 3 | 1 | −3 | 1 | 3 | 3 |
| 3 | −1 | 1 | −1 | 3 | 3 |
| 3 | −1 | −1 | 3 | 1 | 3 |
| 3 | −1 | −3 | −3 | −1 | 3 |
| 3 | 3 | 1 | −3 | 1 | 3 |
| 3 | 3 | −1 | 1 | −1 | 3 |
| 3 | −3 | −1 | −1 | −3 | 3 |
| 3 | −3 | 3 | 1 | 1 | 3 |
| −3 | 1 | 1 | −3 | −1 | −3 |
| −3 | 1 | −1 | 1 | −3 | −3 |
| −3 | 1 | 3 | 3 | 1 | −3 |
| −3 | −1 | −1 | −3 | 3 | −3 |

It should be understood that Table 1 enumerates only some possible values of φ(n) as an example, and the protection scope of this embodiment is not limited to only Table 1. These possible values of φ(n) may be stored in a table form, or may be stored in a matrix form, an array form, or another possible form, and these values may be pre-stored in the terminal and the base station. In addition, even if these values are stored in the table form, these values may alternatively be stored in a form that is different from that in Table 1. For example, these values may alternatively be stored in a form of the following Table 2 or Table 3.

TABLE 2

| No. | φ(0), . . . , φ(5) | | | | | |
|---|---|---|---|---|---|---|
| 1 | 1 | 1 | 3 | −3 | 3 | 1 |
| 2 | 1 | 1 | −3 | −1 | −3 | 1 |
| 3 | 1 | −1 | 1 | −3 | −3 | 1 |
| 4 | 1 | 3 | 3 | 1 | −3 | 1 |
| 5 | 1 | 3 | −3 | 3 | 1 | 1 |
| 6 | 1 | −3 | 1 | 3 | 3 | 1 |
| 7 | 1 | −3 | −1 | −3 | 1 | 1 |
| 8 | 1 | −3 | −3 | 1 | −1 | 1 |
| 9 | −1 | 1 | −1 | 3 | 3 | −1 |
| 10 | −1 | −1 | 3 | 1 | 3 | −1 |
| 11 | −1 | −1 | −3 | 3 | −3 | −1 |
| 12 | −1 | 3 | −1 | −3 | −1 | −1 |
| 13 | −1 | 3 | −1 | −3 | −3 | −1 |
| 14 | −1 | 3 | 3 | −1 | 1 | −1 |
| 15 | −1 | −3 | 3 | −3 | −1 | −1 |
| 16 | −1 | −3 | −3 | −1 | 3 | −1 |
| 17 | 3 | 1 | 1 | 3 | −3 | 3 |
| 18 | 3 | 1 | 3 | −1 | −1 | 3 |
| 19 | 3 | 1 | −3 | 1 | 3 | 3 |
| 20 | 3 | −1 | 1 | −1 | 3 | 3 |
| 21 | 3 | −1 | −1 | 3 | 1 | 3 |
| 22 | 3 | −1 | −3 | −3 | −1 | 3 |
| 23 | 3 | 3 | 1 | −3 | 1 | 3 |
| 24 | 3 | 3 | −1 | 1 | −1 | 3 |
| 25 | 3 | −3 | −1 | −1 | −3 | 3 |
| 26 | 3 | −3 | 3 | 1 | 1 | 3 |
| 27 | −3 | 1 | 1 | −3 | −1 | −3 |
| 28 | −3 | 1 | −1 | 1 | −3 | −3 |
| 29 | −3 | 1 | 3 | 3 | 1 | −3 |
| 30 | −3 | −1 | −1 | −3 | 3 | −3 |

TABLE 3

| No. | φ(0), . . . , φ(5) | | | | | |
|---|---|---|---|---|---|---|
| 1 | 1 | 1 | 3 | −3 | 3 | |
| 2 | 1 | 1 | −3 | −1 | −3 | |
| 3 | 1 | −1 | 1 | −3 | −3 | |
| 4 | 1 | 3 | 3 | 1 | −3 | |
| 5 | 1 | 3 | −3 | 3 | 1 | |
| 6 | 1 | −3 | 1 | 3 | 3 | |
| 7 | 1 | −3 | −1 | −3 | 1 | |
| 8 | 1 | −3 | −3 | 1 | −1 | |
| 9 | −1 | 1 | −1 | 3 | 3 | |
| 10 | −1 | −1 | 3 | 1 | 3 | |
| 11 | −1 | −1 | −3 | 3 | −3 | |
| 12 | −1 | 3 | −1 | −3 | −1 | |
| 13 | −1 | 3 | −1 | −3 | −3 | |
| 14 | −1 | 3 | 3 | −1 | 1 | |
| 15 | −1 | −3 | 3 | −3 | −1 | |
| 16 | −1 | −3 | −3 | −1 | 3 | |
| 17 | 3 | 1 | 1 | 3 | −3 | |
| 18 | 3 | 1 | 3 | −1 | −1 | |
| 19 | 3 | 1 | −3 | 1 | 3 | |
| 20 | 3 | −1 | 1 | −1 | 3 | |
| 21 | 3 | −1 | −1 | 3 | 1 | |
| 22 | 3 | −1 | −3 | −3 | −1 | |
| 23 | 3 | 3 | 1 | −3 | 1 | |
| 24 | 3 | 3 | −1 | 1 | −1 | |
| 25 | 3 | −3 | −1 | −1 | −3 | |
| 26 | 3 | −3 | 3 | 1 | 1 | |
| 27 | −3 | 1 | 1 | −3 | −1 | |
| 28 | −3 | 1 | −1 | 1 | −3 | |
| 29 | −3 | 1 | 3 | 3 | 1 | |
| 30 | −3 | −1 | −1 | −3 | 3 | |

In Table 2 and Table 3, elements in columns with a highlighted background color are sequence numbers or indexes of a value combination of φ(n), and values of the sequence numbers or indexes may more clearly indicate the value combination of φ(n). It should be understood that mapping between a sequence number or an index and the value combination of φ(n) in Table 2 and Table 3 is an example, and content of this embodiment of the present invention is not limited thereto.

In this embodiment, the terminal or the base station determines the corresponding base sequence configuration based on the modulation scheme π/2 BPSK of the uplink data transmission and the length 6 of the reference signal sequence. For details, refer to any one of examples in Table 1 to Table 3. Table 2 is used as an example. Then the terminal or the base station may determine the sequence number or the index of the value combination of φ(n) based on system configurations, for example, system parameters such as a cell identity (cell identity) and a slot number. For example, it is assumed that the determined sequence number or index of the value combination of φ(n) is 3. In this case, an element of the reference signal sequence includes the following elements of the QPSK sequence:

$\{e^{j\pi/4}, e^{-j\pi/4}, e^{j\pi/4}, e^{-j3\pi/4}, e^{-j3\pi/4}, e^{j\pi/4}\}$.

Embodiment 4

In this embodiment, a base sequence configuration of a reference signal sequence corresponding to another modulation scheme includes a length value and a root value of a Zadoff-Chu sequence. For specific content, refer to the following description. The base sequence configuration of the reference signal sequence corresponding to the π/2 BPSK may be the same as that in the description in Embodiment 1 or Embodiment 2.

In this embodiment, a length of a Zadoff-Chu sequence corresponding to the another modulation scheme is also greater than a length of the reference signal sequence. Truncation (truncation) or a segment (segment) of the Zadoff-Chu sequence, namely, some elements of the Zadoff-Chu sequence, may be used as a base sequence of the reference signal sequence corresponding to the another modulation scheme. However, the length of the Zadoff-Chu sequence corresponding to the another modulation scheme is different from a length of a Zadoff-Chu sequence corresponding to the π/2 BPSK.

In an optional implementation, the length of the Zadoff-Chu sequence is 21157, and the root of the Zadoff-Chu sequence has one or more of the following values:

1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, and 20008.

Specifically, the terminal or the base station determines a length $N_{zc}$=21157 of a corresponding Zadoff-Chu sequence based on a fact that the modulation scheme of the uplink data transmission is the another modulation scheme. Then the terminal or the base station may determine a value of a root q of the Zadoff-Chu sequence based on system configurations, for example, system parameters such as a cell identity (cell identity) and a slot number. It is assumed that the terminal or the base station determines that q=1023. An element value of the Zadoff-Chu sequence meets the following equation:

$$X_{1023}(m) = e^{-j\frac{\pi \cdot 1023 \cdot m \cdot (m+1)}{21157}}.$$

Herein, m is an integer, and 0≤m≤21156. A specific value of m may be determined based on factors such as the length of the reference signal sequence and a frequency resource position of the reference signal sequence. This is not limited herein. A sequence including these elements of the Zadoff-Chu sequence is denoted as the base sequence of the reference signal sequence. It is assumed that the length of the reference signal sequence is 60, 60 elements of the Zadoff-Chu sequence are selected as the base sequence. The base sequence may be directly used as the reference signal sequence, or the reference signal sequence may be obtained by performing a specific mathematical operation. In an implementation, the 60 elements m=0, 1 . . . , 35 are selected as the base sequence by default. In another implementation, the 60 elements are selected as the base sequence based on a resource position occupied by the reference signal sequence in entire system bandwidth. For example, it is assumed that the system bandwidth is 50 RBs, and a subcarrier in the system bandwidth is denoted as $\{SC_0, SC_1, \ldots, SC_{599}\}$; and a subcarrier of 5 RBs allocated by the base station for the uplink data transmission is denoted as $\{SC_{12}, SC_{13}, \ldots, SC_{71}\}$. In this case, m=12, 13, . . . , 71.

It should be understood that the length value 21157 of the Zadoff-Chu sequence is only an optional implementation. This embodiment is not limited thereto. In another optional implementation, there may be further another possible length value and root value of the Zadoff-Chu sequence.

In an optional implementation, the length of the Zadoff-Chu sequence is 131969, and the root of the Zadoff-Chu sequence has one or more of the following values:

2908, 5919, 8108, 9176, 11359, 12842, 13721, 18287, 19123, 21435, 22441, 25895, 27039, 30666, 36263, 38169, 40822, 42738, 44949, 51705, 54664, 59740, 61399, 67366, 68376, 70570, 78403, 82997, 86400, and 95108.

In an optional implementation, the length of the Zadoff-Chu sequence is 479971, and the root of the Zadoff-Chu sequence has one or more of the following values:

24335, 35852, 49443, 65019, 76272, 88558, 102028, 126841, 139505, 150710, 169872, 181751, 197023, 210577, 222328, 253191, 264402, 276530, 296245, 307534, 329261, 340466, 352513, 368238, 387393, 402362, 413569, 424829, 437224, and 448552.

It should be understood that, in this embodiment, for a method of generating a corresponding base sequence and reference signal sequence based on the length value and the root value of the Zadoff-Chu sequence in another optional implementation, refer to the example in which $N_{zc}$=21157 and q=1023. Details are not described herein again.

Figure 5:
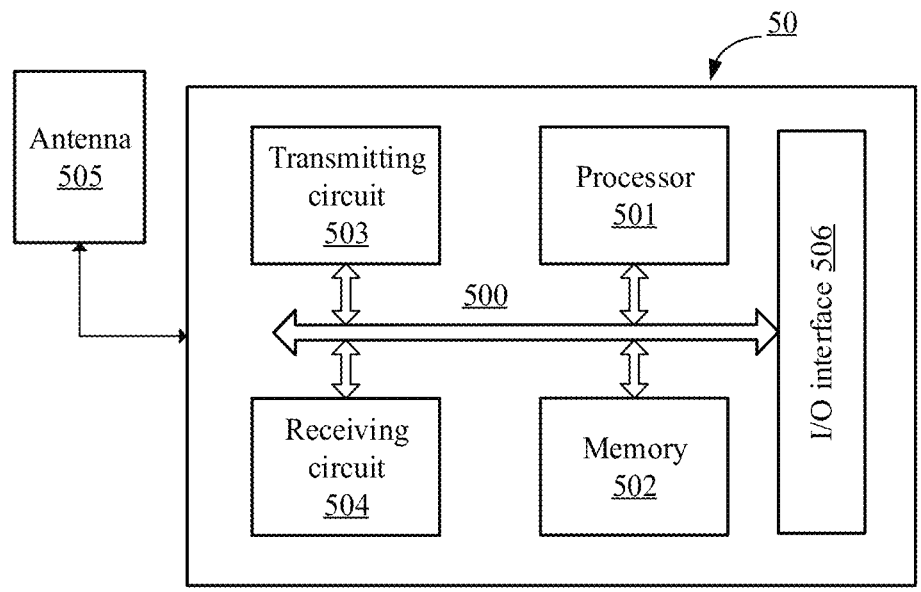
FIG. 5 is a schematic structural diagram of a wireless communications apparatus according to an embodiment of the present invention.

FIG. 5 is a schematic structural diagram of a wireless communications apparatus according to an embodiment of the present invention. The wireless communications apparatus may be a base station or a terminal in a wireless communications system in the embodiments of the present invention. As shown in FIG. 5, a wireless communications apparatus 50 includes a processor 501 and a memory 502 connected to the processor 501. It should be understood that although one processor and one memory are shown in FIG. 5, the wireless communications apparatus 50 may include another quantity of processors and memories.

The memory 502 is configured to store computer programs or computer instructions. These computer programs or instructions may be classified into two types based on functions. When one type of computer program or instruction is executed by the processor 501, the wireless communications apparatus 50 implements steps performed by the terminal in the wireless communication method in the embodiments of the present invention. This type of computer program or instruction may be denoted as a terminal function program. When the other type of computer program or instruction is executed by the processor 501, the wireless communications apparatus 50 implements steps performed by the base station in the wireless communication method in the embodiments of the present invention. This type of computer program or instruction may be denoted as a base station function program.

In addition, the wireless communications apparatus 50 may further include a connection cable 500, a transmitting circuit 503, a receiving circuit 504, an antenna 505, an input/output (English: input/output, I/O) interface 506, and the like. The transmitting circuit and the receiving circuit may be coupled to the antenna, to wirelessly connect to another communications device. The transmitting circuit and the receiving circuit may be alternatively integrated into a transceiver, and the antenna may be a radio frequency antenna supporting a plurality of frequencies. The I/O interface allows the wireless communications apparatus 50 to interact with the another communications device or a user. For example, for the base station, the I/O interface may be a common public radio interface (English: common public radio interface, CPRI), an Ethernet interface, a USB interface, or the like. For the terminal, the I/O interface may be a screen, a keyboard, a microphone, a loudspeaker, a USB interface, or the like. Components inside the wireless communications apparatus 50 may be coupled together by using various connection cables (for example, a bus system). In addition to a data bus, the bus system may further include a power bus, a control bus, a status signal bus, and the like. However, for clarity of description, various buses in this specification are collectively referred to as the bus system.

It should be understood that, in this embodiment of the present invention, when the memory 502 stores the terminal function program, the wireless communications apparatus 50 may be the terminal in the wireless communications system in the embodiments of the present invention. When the memory 502 stores the base station function program, the wireless communications apparatus 50 may be the base station in the wireless communications system in the embodiments of the present invention.

Figure 6:
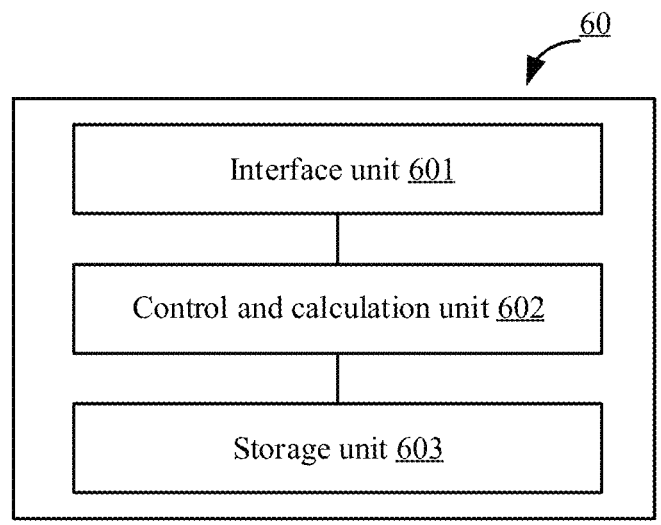
FIG. 6 is a schematic structural diagram of another wireless communications apparatus according to an embodiment of the present invention.

FIG. 6 is another schematic structural diagram of a wireless communications apparatus according to an embodiment of the present invention. The wireless communications apparatus may be a processor. The processor may be embodied as a chip or a system on chip (system on chip, SOC), and is disposed in a base station or a terminal in a wireless communications system in the embodiments of the present invention, so that the base station or the terminal implements the wireless communication method in the embodiments of the present invention. As shown in FIG. 6, a wireless communications apparatus 60 includes an interface unit 601, a control and calculation unit 602, and a storage unit 603. The interface unit is configured to connect to another component of the base station or the terminal, the storage unit 603 is configured to store computer programs or instructions, and the control and calculation unit 602 is configured to decode and execute these computer programs or instructions. It should be understood that these computer programs or instructions may include the foregoing terminal function program, and may also include the foregoing base station function program. When the terminal function program is decoded and executed by the control and calculation unit 602, the terminal can implement functions of the terminal in the wireless communication method in the embodiments of the present invention. When the base station function program is decoded and executed by the control and calculation unit 602, the base station can implement functions of the base station in the wireless communication method in the embodiments of the present invention.

In an optional implementation, these terminal function programs or base station function programs are stored in an external memory of the wireless communications apparatus 60. When the terminal function program or the base station function program is decoded and executed by the control and calculation unit 602, the storage unit 603 temporarily stores some or all content of the terminal function program, or temporarily stores some or all content of the base station function program.

In another optional implementation, these terminal function programs or base station function programs are stored in the storage unit 603 inside the wireless communications apparatus 60. When the storage unit 603 inside the wireless communications apparatus 60 stores the terminal function program, the wireless communications apparatus 60 may be disposed in the terminal in the wireless communications system in the embodiments of the present invention. When the storage unit 603 inside the wireless communications apparatus 60 stores the base station function program, the wireless communications apparatus 60 may be disposed in the base station in the wireless communications system in the embodiments of the present invention.

In still another optional implementation, some content of these terminal function programs or base station function programs is stored in an external memory of the wireless communications apparatus 60, and some other content of these terminal function programs or base station function programs is stored in the storage unit 603 inside the wireless communications apparatus 60.

Figure 7:
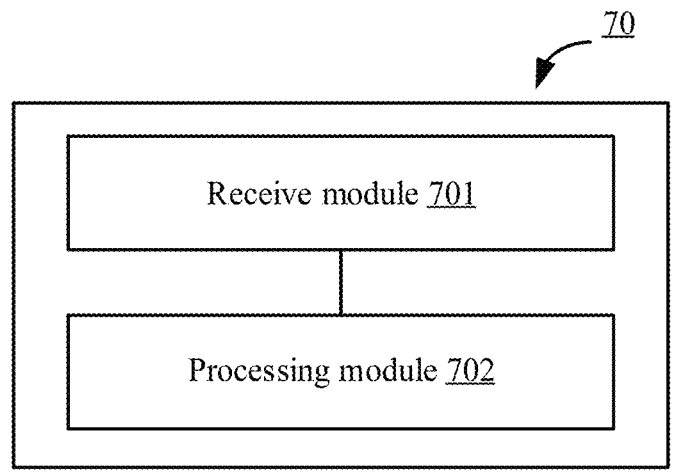
FIG. 7 is a schematic structural diagram of a terminal according to an embodiment of the present invention.

FIG. 7 is a schematic structural diagram of a terminal according to an embodiment of the present invention. As shown in FIG. 7, a terminal 70 includes a receive module 701 and a processing module 702.

The receive module 701 is configured to receive indication information of uplink data transmission, where the indication information is used to indicate a modulation scheme of the uplink data transmission.

The processing module 702 is configured to determine a base sequence configuration of a reference signal sequence corresponding to the modulation scheme of the uplink data transmission, and generate a dedicated demodulation reference signal based on the determined base sequence configuration of the reference signal sequence.

The modulation scheme of the uplink data transmission is one of a plurality of modulation schemes supported by the terminal, the plurality of modulation schemes include at least π/2 BPSK, and a base sequence configuration of a reference signal sequence corresponding to the π/2 BPSK is different from a base sequence configuration of a reference signal sequence corresponding to another modulation scheme in the plurality of modulation schemes.

It should be understood that the terminal 70 may be configured to implement steps performed by the terminal in the wireless communication method in the embodiments of the present invention. For related features, refer to the foregoing text. Details are not described herein again.

In an optional implementation, the receive module 701 may be a receiver, a receiving circuit, a transceiver, or a transceiver circuit, and the processing module 702 may be a processor. In an optional software implementation, the receive module 701 and the processing module 702 may be software modules. In an optional software-hardware combined implementation, the receive module 701 may be a combination of a soft module and one of a receiver, a receiving circuit, a transceiver, or a transceiver circuit, and the processing module 702 may be a combination of a processor and a software module. In another optional implementation, three optional implementations of the receive module 701 and the processing module 702 may be further combined with each other to form a new implementation.

Figure 8:
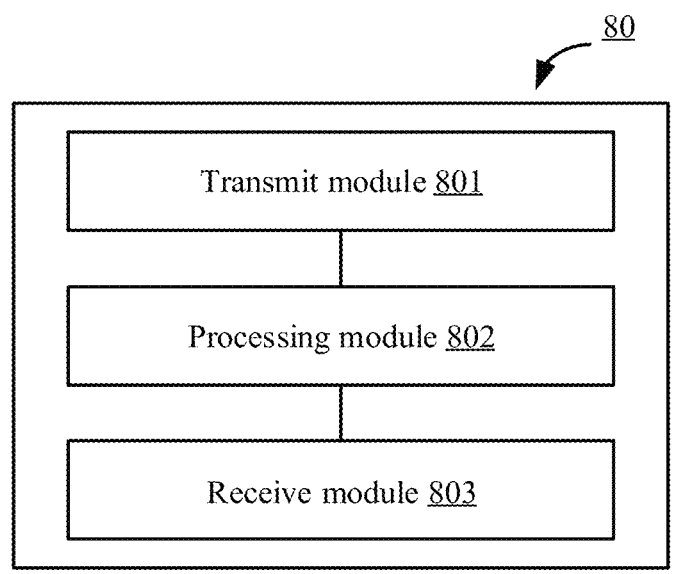
FIG. 8 is a schematic structural diagram of a base station according to an embodiment of the present invention.

FIG. 8 is a schematic structural diagram of a base station according to an embodiment of the present invention. As shown in FIG. 8, a base station 80 includes a transmit module 801, a processing module 802, and a receive module 803.

The transmit module 801 is configured to send indication information of uplink data transmission, where the indication information is used to indicate a modulation scheme of the uplink data transmission.

The receive module 803 is configured to receive a dedicated demodulation reference signal associated with the uplink data transmission.

The processing module 802 is configured to determine a base sequence configuration of a reference signal sequence corresponding to the modulation scheme of the uplink data transmission, to estimate a channel characteristic for the uplink data transmission.

The modulation scheme of the uplink data transmission is one of a plurality of modulation schemes supported by the terminal, the plurality of modulation schemes include at least π/2 BPSK, and a base sequence configuration of a reference signal sequence corresponding to the π/2 BPSK is different from a base sequence configuration of a reference signal sequence corresponding to another modulation scheme in the plurality of modulation schemes.

It should be understood that the base station 80 may be configured to implement steps performed by the base station in the wireless communication method in the embodiments of the present invention. For related features, refer to the foregoing text. Details are not described herein again.

In an optional implementation, the transmit module 801 may be a transmitter, a transmitting circuit, a transceiver, or a transceiver circuit, the processing module 802 may be a processor, and a receive module 803 may be a receiver, a receiving circuit, a transceiver, or a transceiver circuit. In an optional implementation, the transmit module 801, the processing module 802, and the receive module 803 may be software modules. In an optional implementation, the transmit module 801 may be a combination of a soft module and one of a receiver, a receiving circuit, a transceiver, or a transceiver circuit, and the processing module 802 may be a combination of a processor and a software module, and the receive module may be a combination of a software module and one of a receiver, a receiving circuit, a transceiver, or a transceiver circuit. In another optional implementation, three optional implementations of the transmit module 801, the processing module 802, and the receive module 803 may be further combined with each other to form a new implementation.

In this application, a processor is a device or circuit with a computing and processing capability, and may be referred to as a chip or a central processing unit (CPU). The foregoing processor may be a general-purpose processor, a digital signal processor (DSP), an application-specific integrated circuit (ASIC), a field programmable gate array (FPGA) or another programmable logic device, a transistor logic device, a discrete hardware component, a general-purpose processor, or a microprocessor. The processor may be integrated into a system on chip (SOC).

A memory is a device or circuit capable of storing data or information, and may provide an instruction and data for a processor. The memory includes a read-only memory (ROM), a random access memory (RAM), a non-volatile random access memory (NVRAM), a programmable read-only memory, an electrically erasable programmable memory, a register, or the like.

It should be understood that the foregoing descriptions are specific implementations of the present invention, but are not intended to limit the protection scope of the present invention. In the foregoing schematic structural diagrams, only one type of logical function division is shown. During specific implementation, there may be another physical division manner, for example, a plurality of logic modules are embodied as one physical module, or one logic module is divided into a plurality of physical modules. Any modification or replacement readily figured out by a person of ordinary skill in the art shall fall within the technical scope disclosed in the present invention.

What is claimed is:

1. A wireless communication method, comprising:
   receiving indication information of uplink data transmission, wherein the indication information is used to indicate a modulation scheme of the uplink data transmission;
   determining a base sequence configuration of a reference signal sequence corresponding to the modulation scheme of the uplink data transmission; and
   generating a dedicated demodulation reference signal based on the determined base sequence configuration of the reference signal sequence, wherein
   the modulation scheme of the uplink data transmission is one of a plurality of modulation schemes supported by a terminal, the plurality of modulation schemes comprise at least π/2 binary phase shift keying (BPSK), and a base sequence configuration of a reference signal sequence corresponding to the π/2 BPSK is different from a base sequence configuration of a reference signal sequence corresponding to another modulation scheme in the plurality of modulation schemes.

2. The method according to claim 1, wherein
   a cubic metric value of a dedicated demodulation reference signal generated based on the base sequence configuration of the reference signal sequence corresponding to the π/2 BPSK is less than a cubic metric value of a dedicated demodulation reference signal generated based on the base sequence configuration of the reference signal sequence corresponding to the another modulation scheme.

3. The method according to claim 1, wherein
   the base sequence configuration of the reference signal sequence corresponding to the π/2 BPSK comprises a length value and a root value of a Zadoff-Chu sequence, and the reference signal sequence is generated based on the Zadoff-Chu sequence; and
   when a length of the reference signal sequence generated based on the Zadoff-Chu sequence is 6, the length value of the Zadoff-Chu sequence is 1511, and the root of the Zadoff-Chu sequence has one or more of the following values:
   597, 598, 599, 600, 601, 602, 603, 604, 605, 606, 607, 608, 609, 610, 611, 900, 901, 902, 903, 904, 905, 906, 907, 908, 909, 910, 911, 912, 913, or 914.

4. The method according to claim 1, wherein
   the base sequence configuration of the reference signal sequence corresponding to the π/2 BPSK comprises a length value and a root value of a Zadoff-Chu sequence, and the reference signal sequence is generated based on the Zadoff-Chu sequence; and when a length of the reference signal sequence generated based on the Zadoff-Chu sequence is 12, the length value of the Zadoff-Chu sequence is 1277, and the root of the Zadoff-Chu sequence has one or more of the following values:
104, 105, 106, 107, 108, 109, 110, 111, 112, 113, 114, 115, 116, 117, 118, 1159, 1160, 1161, 1162, 1163, 1164, 1165, 1166, 1167, 1168, 1169, 1170, 1171, 1172, or 1173.

5. The method according to claim 1, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 18, the length value of the Zadoff-Chu sequence is 1171, and the root of the Zadoff-Chu sequence has one or more of the following values:
59, 60, 61, 62, 63, 64, 65, 66, 67, 68, 69, 70, 71, 72, 73, 1098, 1099, 1100, 1101, 1102, 1103, 1104, 1105, 1106, 1107, 1108, 1109, 1110, 1111, or 1112.

6. The method according to claim 1, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 24, the length value of the Zadoff-Chu sequence is 1213, and the root of the Zadoff-Chu sequence has one or more of the following values:
45, 46, 47, 48, 49, 50, 51, 52, 53, 54, 55, 56, 579, 580, 581, 632, 633, 634, 1157, 1158, 1159, 1160, 1161, 1162, 1163, 1164, 1165, 1166, 1167, or 1168.

7. The method according to claim 1, wherein
the base sequence configuration of the reference signal sequence corresponding to the π/2 BPSK comprises a phase parameter value of a QPSK sequence, the reference signal sequence is generated based on the QPSK sequence, and an element value of the QPSK meets the following equation:

$X(n) = e^{j\varphi(n)\pi/4}$, wherein X(n) is an $n^{th}$ element of the QPSK sequence, j is an imaginary unit, φ(n) is a phase parameter of the QPSK sequence, and when a length of the reference signal sequence generated based on the QPSK sequence is 6, a value of φ(n) meets a row in the following table:

| φ(0), . . . , φ(5) | | | | | |
|---|---|---|---|---|---|
| 1 | 1 | 3 | −3 | 3 | 1 |
| 1 | 1 | −3 | −1 | −3 | 1 |
| 1 | −1 | 1 | −3 | −3 | 1 |
| 1 | 3 | 3 | 1 | −3 | 1 |
| 1 | 3 | −3 | 3 | 1 | 1 |
| 1 | −3 | 1 | 3 | 3 | 1 |
| 1 | −3 | −1 | −3 | 1 | 1 |
| 1 | −3 | −3 | 1 | −1 | 1 |
| −1 | 1 | −1 | 3 | 3 | −1 |
| −1 | −1 | 3 | 1 | 3 | −1 |
| −1 | −1 | −3 | 3 | −3 | −1 |
| −1 | 3 | −1 | −3 | −1 | −1 |
| −1 | 3 | −1 | −3 | −3 | −1 |
| −1 | 3 | 3 | −1 | 1 | −1 |
| −1 | −3 | 3 | −3 | −1 | −1 |
| −1 | −3 | −3 | −1 | 3 | −1 |
| 3 | 1 | 1 | 3 | −3 | 3 |
| 3 | 1 | 3 | −1 | −1 | 3 |
| 3 | 1 | −3 | 1 | 3 | 3 |
| 3 | −1 | 1 | −1 | 3 | 3 |
| 3 | −1 | −1 | 3 | 1 | 3 |
| 3 | −1 | −3 | −3 | −1 | 3 |
| 3 | 3 | 1 | −3 | 1 | 3 |
| 3 | 3 | −1 | 1 | −1 | 3 |
| 3 | −3 | −1 | −1 | −3 | 3 |
| 3 | −3 | 3 | 1 | 1 | 3 |
| −3 | 1 | 1 | −3 | −1 | −3 |
| −3 | 1 | −1 | 1 | −3 | −3 |
| −3 | 1 | 3 | 3 | 1 | −3 |
| −3 | −1 | −1 | −3 | 3 | −3. |

8. The method according claim 1, wherein
the base sequence configuration of the reference signal sequence corresponding to the another modulation scheme comprises a length value and a root value of a Zadoff-Chu sequence, and the reference signal sequence is generated based on the Zadoff-Chu sequence, wherein
a length of the Zadoff-Chu sequence is 21157, and the root of the Zadoff-Chu sequence has one or more of the following values:
1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, or 20008.

9. The method according to claim 3, wherein
an element value of the Zadoff-Chu sequence meets the following equation:

$$X_q(m) = e^{-j\frac{\pi \cdot q \cdot m \cdot (m+1)}{N_{zc}}},$$

wherein m is an element sequence number of the Zadoff-Chu sequence, $0 \leq m \leq N_{zc}-1$, $X_q(m)$ is an $m^{th}$ element of the Zadoff-Chu sequence, $q$ is a root of the Zadoff-Chu sequence, $N_{zc}$ is the length of the Zadoff-Chu sequence, and j is an imaginary unit.

10. A wireless communication method, comprising:
sending indication information of uplink data transmission, wherein the indication information is used to indicate a modulation scheme of the uplink data transmission;
receiving a dedicated demodulation reference signal associated with the uplink data transmission; and
determining a base sequence configuration of a reference signal sequence corresponding to the modulation scheme of the uplink data transmission, to estimate a channel characteristic for the uplink data transmission, wherein
the modulation scheme of the uplink data transmission is one of a plurality of modulation schemes supported by a terminal, the plurality of modulation schemes comprise at least π/2 binary phase shift keying (BPSK), and a base sequence configuration of a reference signal sequence corresponding to the π/2 BPSK is different from a base sequence configuration of a reference signal sequence corresponding to another modulation scheme in the plurality of modulation schemes.

11. The method according to claim 10, wherein
a cubic metric value of a dedicated demodulation reference signal generated based on the base sequence configuration of the reference signal sequence corresponding to the π/2 BPSK is less than a cubic metric value of a dedicated demodulation reference signal generated based on the base sequence configuration of the reference signal sequence corresponding to the another modulation scheme.

12. The method according to claim 10, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 6, the length value of the Zadoff-Chu sequence is 1511, and the root of the Zadoff-Chu sequence has one or more of the following values:
597, 598, 599, 600, 601, 602, 603, 604, 605, 606, 607, 608, 609, 610, 611, 900, 901, 902, 903, 904, 905, 906, 907, 908, 909, 910, 911, 912, 913, or 914.

13. The method according to claim 10, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 12, the length value of the Zadoff-Chu sequence is 1277, and the root of the Zadoff-Chu sequence has one or more of the following values:
104, 105, 106, 107, 108, 109, 110, 111, 112, 113, 114, 115, 116, 117, 118, 1159, 1160, 1161, 1162, 1163, 1164, 1165, 1166, 1167, 1168, 1169, 1170, 1171, 1172, or 1173.

14. The method according to claim 10, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 18, the length value of the Zadoff-Chu sequence is 1171, and the root of the Zadoff-Chu sequence has one or more of the following values:
59, 60, 61, 62, 63, 64, 65, 66, 67, 68, 69, 70, 71, 72, 73, 1098, 1099, 1100, 1101, 1102, 1103, 1104, 1105, 1106, 1107, 1108, 1109, 1110, 1111, or 1112.

15. The method according to claim 10, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 24, the length value of the Zadoff-Chu sequence is 1213, and the root of the Zadoff-Chu sequence has one or more of the following values:
45, 46, 47, 48, 49, 50, 51, 52, 53, 54, 55, 56, 579, 580, 581, 632, 633, 634, 1157, 1158, 1159, 1160, 1161, 1162, 1163, 1164, 1165, 1166, 1167, or 1168.

16. A wireless communications apparatus, comprising:
a receiver, configured to receive indication information of uplink data transmission, wherein the indication information is used to indicate a modulation scheme of the uplink data transmission;
a non-transitory memory storage comprising instructions; and
one or more hardware processors in communication with the non-transitory memory storage, wherein the one or more hardware processors execute the instructions to:
determine a base sequence configuration of a reference signal sequence corresponding to the modulation scheme of the uplink data transmission; and
generate a dedicated demodulation reference signal based on the determined base sequence configuration of the reference signal sequence, wherein
the modulation scheme of the uplink data transmission is one of a plurality of modulation schemes supported by a terminal, the plurality of modulation schemes comprise at least π/2 binary phase shift keying (BPSK), and a base sequence configuration of a reference signal sequence corresponding to the π/2 BPSK is different from a base sequence configuration of a reference signal sequence corresponding to another modulation scheme in the plurality of modulation schemes.

17. The wireless communications apparatus according to claim 16, wherein
a cubic metric value of a dedicated demodulation reference signal generated based on the base sequence configuration of the reference signal sequence corresponding to the π/2 BPSK is less than a cubic metric value of a dedicated demodulation reference signal generated based on the base sequence configuration of the reference signal sequence corresponding to the another modulation scheme.

18. The wireless communications apparatus according to claim 16, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 6, the length value of the Zadoff-Chu sequence is 1511, and the root of the Zadoff-Chu sequence has one or more of the following values:
597, 598, 599, 600, 601, 602, 603, 604, 605, 606, 607, 608, 609, 610, 611, 900, 901, 902, 903, 904, 905, 906, 907, 908, 909, 910, 911, 912, 913, or 914.

19. The wireless communications apparatus according to claim 16, wherein
the base sequence configuration of the reference signal sequence corresponding to the π/2 BPSK comprises a length value and a root value of a Zadoff-Chu sequence, and the reference signal sequence is generated based on the Zadoff-Chu sequence; and
when a length of the reference signal sequence generated based on the Zadoff-Chu sequence is 12, the length value of the Zadoff-Chu sequence is 1277, and the root of the Zadoff-Chu sequence has one or more of the following values:

104, 105, 106, 107, 108, 109, 110, 111, 112, 113, 114, 115, 116, 117, 118, 1159, 1160, 1161, 1162, 1163, 1164, 1165, 1166, 1167, 1168, 1169, 1170, 1171, 1172, or 1173.

20. The wireless communications apparatus according to claim 16, wherein the base sequence configuration of the reference signal sequence corresponding to the $\pi/2$ BPSK comprises a length value and a root value of a Zadoff-Chu sequence, and the reference signal sequence is generated based on the Zadoff-Chu sequence; and when a length of the reference signal sequence generated based on the Zadoff-Chu sequence is 18, the length value of the Zadoff-Chu sequence is 1171, and the root of the Zadoff-Chu sequence has one or more of the following values:

59, 60, 61, 62, 63, 64, 65, 66, 67, 68, 69, 70, 71, 72, 73, 1098, 1099, 1100, 1101, 1102, 1103, 1104, 1105, 1106, 1107, 1108, 1109, 1110, 1111, or 1112.

* * * * *